(12) United States Patent
Griffin et al.

(10) Patent No.: US 11,630,326 B2
(45) Date of Patent: *Apr. 18, 2023

(54) INDUCED APERTURE LENS AND METHOD

(71) Applicant: Visioneering Technologies, Inc., Alpharetta, GA (US)

(72) Inventors: Richard A. Griffin, Newberry, FL (US); Rick E. Payor, Cumming, GA (US); Mark K. Tyson, Flemington, NJ (US); Sally M. Dillehay, Roswell, GA (US)

(73) Assignee: Visioneering Technologies, Inc., Alpharetta, GA (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/481,621

(22) Filed: Sep. 22, 2021

(65) Prior Publication Data
US 2022/0011597 A1 Jan. 13, 2022

Related U.S. Application Data

(63) Continuation of application No. 15/040,518, filed on Feb. 10, 2016.

(51) Int. Cl.
*G02C 7/04* (2006.01)
*A45C 11/00* (2006.01)

(52) U.S. Cl.
CPC .............. *G02C 7/041* (2013.01); *G02C 7/042* (2013.01); *G02C 7/047* (2013.01); *G02C 7/049* (2013.01); *A45C 11/005* (2013.01); *G02C 7/044* (2013.01); *G02C 2202/24* (2013.01)

(58) Field of Classification Search
CPC .............. G02C 7/041; G02C 7/049; G02C 2202/024; G02C 7/042; G02C 7/047; G02C 7/044; G02C 2202/24; A45C 11/005

USPC .................................................. 351/159.052
See application file for complete search history.

(56) References Cited

U.S. PATENT DOCUMENTS

| | | |
|---|---|---|
| 4,640,595 A | 2/1987 | Volk |
| 4,883,350 A | 11/1989 | Muckenhirn |
| 5,112,351 A | 5/1992 | Christie et al. |
| 5,192,317 A | 3/1993 | Kalb |
| 5,225,858 A | 7/1993 | Portney |
| 5,327,181 A | 7/1994 | Waido |
| 5,436,678 A | 7/1995 | Carroll |
| 5,448,312 A | 9/1995 | Roffman et al. |

(Continued)

FOREIGN PATENT DOCUMENTS

WO 2008029293 3/2008

OTHER PUBLICATIONS

Smith III, E.L. et al. "Peripheral Vision Can Influence Eye Growth and Refractive Development in infant Monkeys", Investigative Ophthalmology & Visual Science; vol. 46, No. 11; pp. 3965-3972 (2005).

(Continued)

*Primary Examiner* — G. G. King
(74) *Attorney, Agent, or Firm* — Seyfarth Shaw LLP

(57) ABSTRACT

Disclosed are lenses and methods for verifying a lens with an induced aperture. The lenses can have a geometry that, among other things, maintains a centered position about a wearer's eye to prevent more than a permissible amount of movement of the lens relative to the eye. Further disclosed is a method for verifying the power profiles used with the lens, and a lens that can have a single power profile for a wide range of presbyopia.

21 Claims, 10 Drawing Sheets

(56) References Cited

U.S. PATENT DOCUMENTS

| | | | |
|---|---|---|---|
| 5,619,289 | A | 4/1997 | Seidner et al. |
| 5,650,838 | A | 7/1997 | Roffman et al. |
| 5,684,560 | A | 11/1997 | Roffman et al. |
| 5,796,462 | A | 8/1998 | Roffman |
| 5,815,237 | A | 9/1998 | Vayntraub |
| 5,835,187 | A | 11/1998 | Martin |
| 5,929,969 | A | 7/1999 | Roffman |
| 5,975,694 | A | 11/1999 | Vayntraub |
| 6,030,077 | A | 2/2000 | Sawano et al. |
| 6,260,966 | B1 | 7/2001 | Sawano et al. |
| 6,286,956 | B1 | 9/2001 | Oyama et al. |
| 6,474,814 | B1 | 11/2002 | Griffin |
| 7,025,460 | B2 | 4/2006 | Smith |
| 7,178,918 | B2 | 2/2007 | Griffin |
| 8,876,287 | B2 | 11/2014 | Back et al. |
| 2004/0237971 | A1 | 12/2004 | Radhakrishnan et al. |
| 2005/0068494 | A1 | 3/2005 | Griffin |
| 2007/0296916 | A1 | 12/2007 | Holden et al. |
| 2009/0161065 | A1 | 6/2009 | Smith et al. |
| 2010/0036489 | A1 | 2/2010 | Lindacher et al. |
| 2014/0111763 | A1 | 4/2014 | Griffin |
| 2015/0226981 | A1 | 8/2015 | Lindacher et al. |

OTHER PUBLICATIONS

Singapore Search Report and Written Opinion for Application No. 10201705911Y, dated Dec. 16, 2019, 7 pages.

Hall What You Need to Know About Sagittal Height and Scieral Lenses: Contact Lens Spectrum, May 2015.

FDA Publication ucm080960 from https://www.fda.gov/downloads/MedicalDevices/.../ucm080960.pdf, archived 2015.

Gonzalez-Cavada et al. "Base Curve Influence on the Fitting and Comfort of the Senofilcon A Contact Lens" J. Optom, vol. 2, No. 2, pp. 90-93, 2009.

Webpage "Contact Lenses—Base Curve & Diameter / from Vision Direct UK" from http://www.visiondirect.co.uk/contact-lenses-base-curve-diameter, archived 2015.

Webpage "Contact Lens FAQ—Washington Family Eyecare Center" from http://www.wfeyecare.com/contact-lens-faq.html, archived 2015.

Singapore Written Opinion for Application No. 10201705911Y, dated Nov. 22, 2021, 6 pages.

INDUCED APERTURE LENS AND METHOD

TECHNICAL FIELD OF THE INVENTION

The present application relates generally to optical lenses. More particularly, the present application relates to methods for creating optical lenses with induced apertures and parameters for improving the vision of the wearer and comfort of the lenses.

BACKGROUND OF THE INVENTION

Myopia or short sightedness is a condition in which the far-point of the eye is less than infinite in distance from the surface of the eye. A myopic eye can see objects clearly only within a finite distance limited by the level of myopia in the eye. Advancing myopia is the result of the scleral ball of the eye elongating so that the retina that lies against the posterior inner wall of the eye moves behind the eye's distance image focal point. A light diverging or "minus" lens is conventionally used to move the focused light from in front of the retina backward to the retinal plane. The minus lens, whether spectacle lens, intraocular lens, contact lens, or other light diverging ophthalmic device, allows the myopic eye to regain the clarity of objects at a longer distance.

Presbyopia is generally accepted to be caused by the lack of elasticity of the crystalline lens in the eye. When a person views near objects, the eye accommodates the divergent, rather than parallel, light arriving from the near object. The eye will then perform the act of accommodation resulting in a physical change to steepen the shape of the crystalline lens within the eye. By flexing in this manner, the lens re-converges and focuses the light from near objects on the retina. Accommodation increases the convergence of light waves by causing the eye's intraocular lens surfaces to be more steeply curved, which in turn adds focal power to the optical system of the eye. The closer an object is viewed, the greater the accommodative demand placed on the eye.

Generally speaking, a person's crystalline lens will stiffen as the person ages, losing its accommodative ability and likewise losing its ability to change shape. This stiffening therefore prevents the eye from focusing light properly when viewing objects at close range, leading to the condition known as presbyopia. Reading glasses are commonly provided to treat presbyopia.

To treat both presbyopia and the progression of myopia, lenses have been proposed that create an induced aperture. For example, U.S. patent application Ser. No. 14/126,056 and U.S. Pat. No. 7,178,918, the contents of which are incorporated by reference in their entirety, describe a lens that includes a central zone of clear vision where the refractive power rises slowly and continuously from a central power to a limit of clear vision. This central zone is surrounded by a more rapidly increasing power distribution generating a perceivable blur to the user in the area surrounding the central power. Such a power distribution has a central or apex area having distance vision correcting power and a power distribution creating a blurred region outside of the apex area so as to cause an "induced aperture." Although the lens is not a physical pinhole, it produces similar increased depth of focus effects to the user without suffering from the loss of light and increased diffraction inherent in physical pinholes. This lens increases the depth of focus, therefore requiring less from the eye's accommodation to see clearly at near distances, and reducing accommodative stress to thereby limit the progression of myopia and treat presbyopia.

The induced aperture can be most advantageous when located near the center of the wearer's eye. Because of this, movement of the lens is permitted, but movement beyond a particular threshold can prevent the induced aperture from performing its intended function. Also, traditional American National Standards Institute (ANSI) methods of characterizing soft contact lens power profiles were inadequate to predict clinical performance for the induced aperture lenses. These standards were also inadequate to produce lenses of a single power profile for a wide range of presbyopia.

SUMMARY OF THE INVENTION

In an embodiment, the present application discloses various lenses and methods for producing a lens having an induced aperture. For example, the lenses can have a geometry that maintains a centered position about a wearer's eye to prevent substantial movement of the lens about the eye. A novel method can be used for verifying the power profiles used with this lens, and the method can produce a lens having a single power profile for a wide range of presbyopes.

In particular, the present application discloses an ophthalmic lens including an apex area having distance vision correcting power and a power distribution creating a blurred region outside of the apex area so as to cause an induced aperture. The base curve can be between 7.9 mm and 8.5 mm; and the lens diameter can be between 14.3 and 14.5 mm.

Further disclosed is an ophthalmic lens including an apex area having distance vision correcting power and a power distribution creating a blurred region outside of the apex area so as to cause an induced aperture. The lens can be made of polymacon, and the power distribution can include a power profile having an aperture inducing power rise between +2.00 to +2.75 diopters.

Also disclosed is an ophthalmic lens including an apex area having distance vision correcting power and a power distribution creating a blurred region outside of the apex area so as to cause an induced aperture. The lens can be made of etafilcon, and the power distribution can include an aperture inducing power rise between +2.375 to +3.125.

Still further disclosed is an ophthalmic lens including an apex area having distance vision correcting power and a power distribution creating a blurred region outside of the apex area so as to cause an induced aperture. The power distribution can include an aperture inducing power rise between +2.00 to +3.25 diopters, for example, with silicon hydrogel material lenses.

Further disclosed is an ophthalmic lens for a user requiring a labeled power for clear vision. The ophthalmic lens can include an apex area having distance vision correcting power and a power distribution creating a blurred region outside of the apex area so as to cause an induced aperture. The labeled power can be an area weighted average of a sagittal power as a function of radius from a lens center.

Also disclosed is a combination of an ophthalmic lens and a package containing the ophthalmic lens. The combination can include the ophthalmic lens including an apex area having distance vision correcting power and a power distribution creating a blurred region outside of the apex area so as to cause an induced aperture. It can also include the package being marked with a labeled power that is substantially equivalent to an area weighted average of a sagittal power as a function of radius from a lens center.

Even further disclosed is an ophthalmic lens having an apex area with distance vision correcting power and a power distribution creating a blurred region outside of the apex area so as to cause an induced aperture. The lens can have a sag between about 3.7 mm and 4.75 mm.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
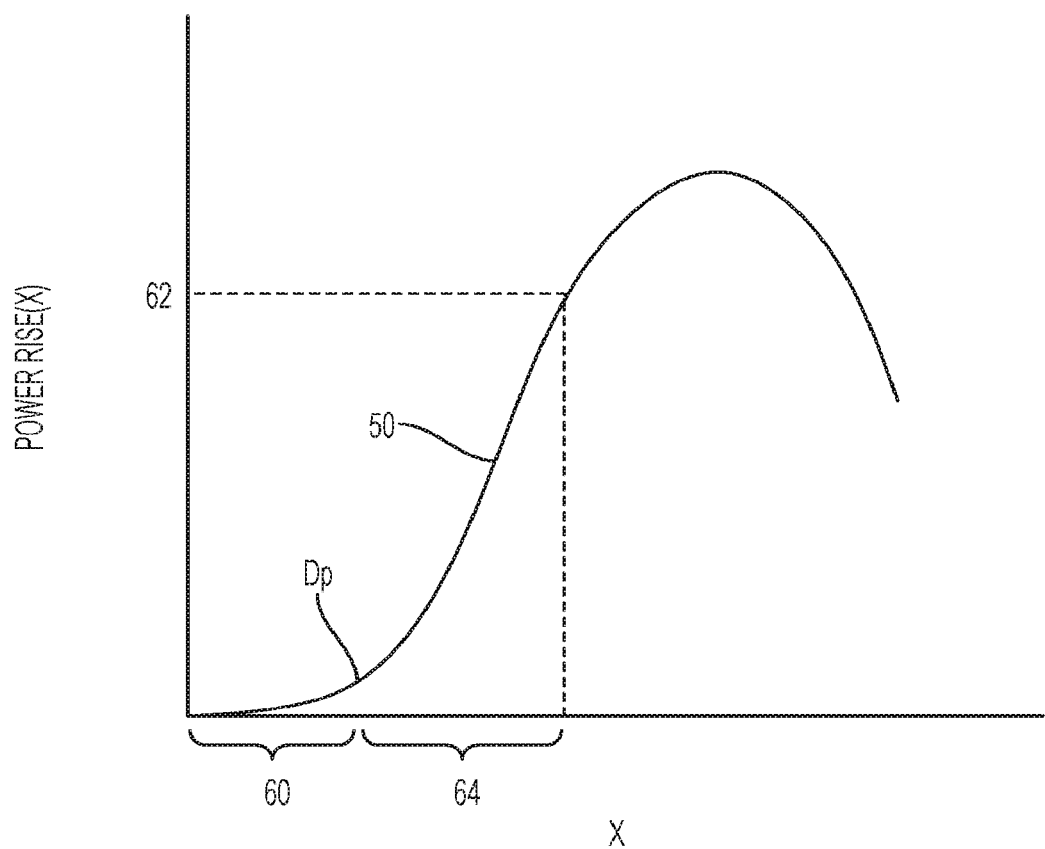
FIG. 1 is a plot of the radial power distribution for embodiments of a lens according to the invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present application discloses, for example, lenses and methods for verifying a lens with an induced aperture. The induced aperture can include a clear power around a center point of the wearer's eye, and a blur region immediately surrounding the center point. The wearer will therefore not perceive an aperture in the middle of their vision but will have the optical benefits of an aperture without a physical aperture in the lens. The power rise about the distance power of the apical aperture is not seen by wearers while viewing distance objects through the aperture. This feature of the aperture allows for a wide range of presbyopia correction.

The lenses can have a geometry that maintains a centered position about a wearer's eye to prevent more than a permissible amount of movement of the lens relative to the eye. Further disclosed is a method for verifying that the power profiles used with the lens correspond to labeled powers a user would normally wear with a lens not having an induced aperture.

In some embodiments, a lens according to the present application can include a continuous axi-symmetric power distribution that provides multiple functions. A central portion or apex of the lens can have a power distribution selected preferably for correcting a user's distance vision. Surrounding the distance corrective power, the power distribution can increase in power quickly over a short radial dimension to produce a blur effect on the user's vision. This radial area of rapidly rising power is termed here for convenience a "blur" zone. For example, the magnitude of blur in the blur zone can be selected so that the eye cannot resolve a level of detail in the distance.

This induced optical aperture generates an increased depth of focus due in part to the user's cortical response to the blur of inhibition. By properly specifying the distance vision power to the particular user, the associated increased depth of focus of the lens will compensate, at least partially, for defocus occurring when the user attempts near vision. This compensatory or "pseudo" accommodation provides clearer vision for the presbyope and reduced accommodative stress and accommodative lag stress that are believed to be associated with myopia progression.

FIG. 1 depicts a graph of the distribution 50 of the optical power rise as a function of radial dimension (x) from the apex of a lens according to the invention. As used herein, the term "power rise" can mean the power above the distance corrective power at the apex of the lens (apical power). A centrally located distance vision region 60 has a power distribution that varies within a power range for distance vision correction. The distance correction power is that power providing clear vision when viewing objects infinitely distant from the user. The distribution power rise initially increases continuously but slowly as the radius moves away from the apical center. This continues to a design point $D_p$ at a radial dimension in the range of about 0.5 to 1.5 millimeters from the apex, for example.

Beyond the design point $D_p$, the power increases more quickly and continuously until a maximum power value 62 is reached. The portion of the lens and power distribution 50 between the design point $D_p$ and peak power 62 defines and creates a blur zone 64. The rapidly rising power in the blur zone 64 produces the unfocused light impinging peripherally on the retina to create a blur. In some embodiments, immediately outside the design point $D_p$, the power distribution rises sufficiently quickly to create a blur and to reach a maximum power within the constraint of the pupillary dimension. The blur produced by the lens is inhibited or suppressed by the user's optical cortical system. Accordingly, the blur is not recognized by the user.

In FIG. 1, the power distribution 50 is shown to continue beyond the peak power to illustrate that the power distribution 50 may be defined as a portion of a continuous power relationship. As discussed herein, the optical power is the front surface tangential power, which may be somewhat different from the through lens sagittal power or average power at any point on a lens.

Design of the Lens to Improve Fitting Characteristics

Clinical testing of lenses having induced apertures showed that the clinical visual performance degraded with lens movement and lens decentration. This was unexpected, as it is preferable for a soft contact lens to have movement with a blink to improve the physiology of the cornea. Through experimental testing, the present inventors discovered lens parameters, including base curve radius, diameter, and thickness profile, to minimize (although not necessarily prevent) lens movement about the eye. The lens parameters also allowed the lens to center about the visible iris.

As shown below, the inventors discovered induced aperture lenses to generally be neither too tight nor too loose when the base curve is a radius between 7.9 mm and 8.5 mm, preferably 8.1 mm to 8.3 mm. Similarly, the inventors discovered a well-fitting lens with a back surface saggital depth (otherwise known by the abbreviation "sag") between 3.7 mm to 4.75 mm, preferably 3.9 mm to 4.75 mm, more preferably 4.05 mm to 4.50 mm, OR a lens diameter between 14.0 mm to 14.5 mm, preferably 14.3 mm to 14.5 mm. Outside of these ranges, the inventors discovered the performance and fit of the lens to decline unexpectedly, showing the criticality of these ranges. In exemplary embodiments, and to even further improve the fit and function of the lens, the present inventors discovered increased performance with lenses having an edge thickness of 0.145 mm at 0.30 mm radially in from the lens edge verifying that. Further, exemplary well-fitting lenses had a thickness profile with a center thickness between 0.100-0.120 mm and a peripheral thickness of 0.220-0.310 at a chord diameter of 12.30 mm. Below are tables illustrating the data collected by the inventors that contributed to the discovery of the above ranges.

and diameter values, the data discussed herein was used to calculate various sag ranges that also showed unexpected results. During these exemplary experimental tests, curved lenses that were steeper in the center and flatter in the periphery did not perform better than substantially spherical geometries. For this reason, only the results of the substantially spherical back surface base curves are presented in Tables 1-A and 1-B above. For each tested lens, Tables 1-A and 1-B include the tested "Base Curve" in mm, the results for each thickness "Thickness—Center, Peripheral" in mm, and the "Test Number" referring to the specific design version tested with these dimensions. It was determined that lenses providing an induced aperture, for example that shown in FIG. 1, perform better when maintained generally in the center of the visible iris of the eye. For this reason, one design consideration was to position the center of the lens as close as practical to the pupil center or line of sight of the eye.

Conventionally speaking, a "perfectly-centered" soft contact lens is centered about the visible iris of the eye, and is normally not centered about the pupil center or the line of sight of the eye. In designing the lenses and performing the

TABLE 1-A

Base Curve Range Chart

| Base Curve | Thickness - Center, Peripheral | Test Number | Movement With Blink | Primary Gaze Lag | Up Gaze Lag |
|---|---|---|---|---|---|
| 7.9 | 0.120, 0.220 | 18 | avg 0.10 mm, 10% 0.0 mm movement | avg 0.07 mm, 0% >0.3 mm | avg 0.22 mm, 0% >0.3 mm |
| 7.9 | 0.120, 0.310 | 19 | avg 0.08 mm, 26% 0.0 mm movement | avg 0.06 mm, 0% >0.3 mm | avg 0.19 mm, 0% >0.3 mm |
| 8.1 | 0.120, 0.220 | 15 | N/A | avg 0.14 mm, 0% >0.3 mm | avg 0.31 mm, 39% >0.3 mm |
| 8.1 | 0.120, 0.310 | 17 | avg 0.09 mm, 16% 0.0 mm movement | avg 0.05 mm, 0% >0.3 mm | avg 0.17 mm, 2% >0.3 mm |
| 8.1 | 0.120, 0.310 | 21 | avg 0.11 mm, 0% 0.0 mm movement | avg 0.12 mm, 0% >0.3 mm | avg 0.21 mm, 8% >0.3 mm |
| 8.1 | 0.120, 0.310 | 22 | avg 0.11 mm, 0% 0.0 mm movement | avg 0.07 mm, 0% >0.3 mm | avg 0.21 mm, 8% >0.3 mm |
| 8.3 | 0.100, 0.220 | 14 | N/A | avg 0.14 mm, 0% >0.3 mm | avg 0.34 mm, 36% >0.3 mm |
| 8.3 | 0.120, 0.310 | 16 | N/A | avg 0.14 mm, 0% >0.3 mm | avg 0.33 mm, 39% >0.3 mm |
| 8.3 | 0.120, 0.310 | 24 | avg 0.19 mm, 0% 0.0 mm movement | avg 0.11 mm, 0% >0.3 mm | avg 0.20 mm, 0% >0.3 mm |
| 8.5 | 0.100, 0.310 | 9 | N/A | avg 0.14 mm, 0% >0.3 mm | avg 0.37 mm, 71 >0.3 mm |
| 8.5 | 0.100, 0.220 | 11 | N/A | avg 0.19 mm, 7% >0.3 mm | avg 0.47 mm, 64% >0.3 mm |
| 8.5 | 0.100, 0.220 | 12 | N/A | avg 0.18 mm, 0% >0.3 mm | avg 0.41 mm, 62% >0.3 mm |
| 8.5 | 0.100, 0.220 | 13 | N/A | avg 0.19 mm, 0% >0.3 mm | avg 0.41 mm, 52% >0.3 mm |

TABLE 1-B

Base Curve Range Chart

| Test Number | Decentration - Vertical | Decentration - Horizontal | Lens Buckling/ Fluting | Optical Distortion | Result Summary | Sample Size |
|---|---|---|---|---|---|---|
| 18 | avg 0.00 mm, 0% >0.3 mm | avg 0.17 mm, 0% >0.3 mm | 0% | 2% | 4% too tight | 50 eyes |
| 19 | avg 0.00 mm, 0% >0.3 mm | avg 0.17 mm, 0% >0.3 mm | 0% | 0% | 6% too tight | 50 eyes |
| 15 | avg 0.06 mm, 6% >0.3 mm | avg 0.16 mm, 16% >0.3 mm | 0% | 0% | 0% too loose or tight | 62 eyes |
| 17 | avg 0.00 mm, 0% >0.3 mm | avg 0.16 mm, 0% >0.3 mm | 0% | 0% | 0% too tight | 50 eyes |
| 21 | avg 0.00 mm, 0% >0.3 mm | avg 0.16 mm, 0% >0.3 mm | 0% | 0% | 0% too tight | 36 eyes |
| 22 | avg 0.00 mm, 0% >0.3 mm | avg 0.12 mm, 0% >0.3 mm | 0% | 0% | 0% too tight | 36 eyes |
| 14 | avg 0.07 mm, 3% >0.3 mm | avg 0.18 mm, 13% >0.3 mm | 0% | 0% | 0% too loose or tight | 76 eyes |
| 16 | avg 0.08 mm, 6% >0.3 mm | avg 0.21 mm, 19% >0.3 mm | 0% | 0% | 0% too loose or tight | 62 eyes |
| 24 | avg 0.00 mm, 0% >0.3 mm | avg 0.09 mm, 0% >0.3 mm | 0% | 0% | 0% too loose or tight | 52 eyes |
| 9 | avg 0.08 mm, 0% >0.3 mm | avg 0.19 mm, 11% >0.3 mm | 0% | 0% | 0% too loose or tight | 38 eyes |
| 11 | avg 0.10 mm, 5% >0.3 mm | avg 0.30 mm, 31% >0.3 mm | 0% | 0% | 7% too loose or decentered | 42 eyes |
| 12 | avg 0.08 mm, 5% >0.3 mm | avg 0.20 mm, 21% >0.3 mm | 0% | 0% | 0% too loose or tight | 42 eyes |
| 13 | avg 0.10 mm, 5% >0.3 mm | avg 0.25 mm, 21% >0.3 mm | 0% | 0% | 2% decentered | 42 eyes |

Determining these critical ranges required the fabrication, measurement verification, and clinical testing of lenses from a base curve average of 7.9 mm to 8.5 mm, with base curves outside this range unexpectedly yielding poor results. As will be seen, because sag is a calculation based on base curve clinical tests discussed herein, the goal was therefore to reduce the primary gaze decentration relative to the visible iris. As shown in Tables 1-A and 1-B, the vertical decentration reduced from an average of 0.1 mm for the 8.5 mm base curve to 0.00 mm for the 7.9 mm base curve. For thicker designs (for example, Design 24 with an 8.3 mm base curve, Designs 17, 21 and 22 with an 8.1 mm base curve, and Designs 18 and 19 with a 7.9 mm base curve) the vertical decentration was minimal at an average of 0.00 mm with no lenses showing a significant (>0.3 mm) amount of decentration. The horizontal decentration reduced from averages of 0.25 to 0.30 mm for the 8.5 mm base curve to 0.12 mm for the 8.1 mm base curve. For the thicker designs (for example, Design 24 with an 8.3 mm base curve, Designs 17, 21 and 22 with an 8.1 mm base curve, and Designs 18 and 19 with a 7.9 mm base curve) the decentration was minimized at an average of 0.09 to 0.17 mm with no lenses showing a significant (>0.3 mm) amount of decentration.

In general, lens lag is considered as the decentration away (in the opposite direction) from the primary gaze centration when looking up ("Up Gaze Lag" as shown in the above tables) or looking left and right (horizontal gaze lag). Lens lag causes the center of the lens to temporarily deviate from the primary gaze centration position as the wearer looks up, down, and to the sides. Because the disclosed lens performs better when centered about the eye, a design goal was to reduce lens lag relative to the primary gaze centration position (referred to as "Primary Gaze Lag" and "Up Gaze Lag" in the above tables). The primary gaze lag reduced from an average of 0.19 mm for the 8.5 mm base curve to 0.03 mm for the 8.1 mm base curve samples. For some of the thicker designs (for example, Designs 17 and 22 with an 8.1 mm base curve, and Designs 18 and 19 with a 7.9 mm base curve) primary gaze lag was minimal at an average of 0.05 to 0.07 mm with no lenses showing a significant (>0.3 mm) lag. The up gaze lag reduced from an average of 0.47 mm for the 8.5 mm base curve to 0.17 mm for the 8.1 mm base curve. For some of the thicker designs (for example, Design 24 with an 8.3 mm base curve, Designs 17, 21 and 22 with an 8.1 mm base curve, and Designs 18 and 19 with a 7.9 mm base curve) up gaze lag was minimal at an average of less than 0.22 mm with 0 to 8% of lenses showing a significant (>0.3 mm) lag.

Primary gaze lens movement with a blink is also a good indication of the "tightness" of the lens fitting. This tightness results from the suction between the lens and the eye. This suction holds the lens centered on the eye and can cause the edge of the lens to indent into the conjunctiva of the eye. Lens movement with a blink is believed to improve the physiology of the cornea, especially for repeated overnight lens wear (commonly referred to as "extended" or "continuous wear"). Lens movement with a blink also causes the center of the lens to temporarily deviate from the center of the visible iris after each blink. Another design goal of the above empirical study was therefore to reduce primary gaze lens movement (discussed in Table 1-A and 1-B as "Movement with Blink" and measured in mm) without having an apparently immobile or bound lens. An immobile lens would be considered a lens having no visible movement, or movement of less than clinical detection limit of 0.05 mm. As discussed above, it is preferable for the lens to have some minimal movement with a blink to improve the physiology of the cornea.

Primary gaze lens movement was observed to be more with a blink for the 8.5 mm base curves. However, precise measurements for the lens movement were not collected for these designs or any other with an "N/A" listed in this column. Primary gaze lens movement with a blink reduced from an average of 0.19 mm for the 8.3 mm base curve to 0.08 mm for the 7.9 mm base curve. For some of the thicker designs (Design 24 with an 8.3 mm base curve, and Designs 21 and 22 with an 8.1 mm base curve) primary gaze lens movement with a blink was minimal at averages of 0.11 to 0.19 mm with no lenses showing zero (0.0 mm) movement. For the thicker Design 17 with an 8.1 mm base curve, and Designs 18 and 19 with a 7.9 mm base curve, no primary gaze lens movement with a blink was seen in 10 to 26% of the tested lenses.

Lens buckling or fluting results from excessive lens material being located toward the edge of the lens and is caused by the lens being too flat to conform to the curvature of the eye. Another design goal was therefore to avoid significant lens buckling or fluting, as shown in the "Lens Buckling/Fluting" column of the above tables. None of the lenses tested had lens buckling or fluting.

Optical distortion results from excessive lens material existing near the center of the lens and is caused by the lens being too steep to conform to the curvature of the eye. Another design goal was therefore to avoid a significant amount of optical distortion, as shown in the column labeled "Optical Distortion." Optical distortion was seen in 2% of the lenses for Design 18 with a 7.9 mm base curve lens, which is not preferable, but acceptable.

A clinician then assessed the lens fitting based on a combination of the above parameters and assessments from the wearer based on vision and comfort. Another design goal was therefore to have a single base curve where all lenses within that base curve have an acceptable fit. This is shown in the above tables in the column labeled "Result Summary." A minimal percentage of too loose lenses were observed with Designs 11 and 13 having an 8.5 mm base curve, and a minimal percentage of too tight lenses were observed in Designs 18 and 19 having a 7.9 mm base curve. For the other lens designs, 100% acceptable fittings existed for all designs.

The present inventors also discovered that thicker lens designs (0.120 mm/0.310 mm central/peripheral thickness) were best for both the 8.1 mm and 8.3 mm base curves. The less-optimal performance with the 7.9 mm and 8.5 mm base curves was also reduced with the thicker 0.310 mm peripheral thickness designs. None of the Design 9 lenses (8.5 mm base curve and 0.100/0.310 mm central/peripheral thickness) were summarized as "too loose" but they still exhibited degradation in centration and lag. None of the thicker Design 19 lenses (7.9 mm base curve, 0.120/0.310 mm central/peripheral thickness) exhibited optical distortion but a significant percentage showed the less desirable but still acceptable 0.0 mm primary gaze movement with a blink.

TABLE 2

Subjective Data for 7.9-8.5 mm Base Curve

| Base Curve | Thickness - Center, Peripheral | Test Number | Distance Vision (% >=84) | Near Vision (% >=67) | Overall Vision (% >=76) | Comfort (% >=92) | Sample Size (subjects) |
| --- | --- | --- | --- | --- | --- | --- | --- |
| 7.9 | 0.120, 0.220 | 18 | 60.0% | 76.0% | 56.0% | 56.0% | 25 |
| 7.9 | 0.120, 0.310 | 19 | 52.0% | 60.0% | 48.0% | 52.0% | 25 |

TABLE 2-continued

Subjective Data for 7.9-8.5 mm Base Curve

| Base Curve | Thickness - Center, Peripheral | Test Number | Distance Vision (% >=84) | Near Vision (% >=67) | Overall Vision (% >=76) | Comfort (% >=92) | Sample Size (subjects) |
|---|---|---|---|---|---|---|---|
| 8.1 | 0.120, 0.220 | 15 | 58.1% | 87.1% | 61.3% | 64.5% | 31 |
| 8.1 | 0.120, 0.310 | 17 | 68.0% | 100.0% | 76.0% | 64.0% | 25 |
| 8.1 | 0.120, 0.310 | 21 | 94.4% | 94.4% | 88.9% | 72.2% | 18 |
| 8.1 | 0.120, 0.310 | 22 | 66.7% | 83.3% | 72.2% | 66.7% | 18 |
| 8.3 | 0.100, 0.220 | 14 | 67.7% | 87.1% | 71.0% | 74.2% | 31 |
| 8.3 | 0.120, 0.310 | 16 | 64.5% | 90.3% | 61.3% | 67.7% | 31 |
| 8.3 | 0.120, 0.310 | 24 | 95.7% | 95.7% | 95.7% | 73.9% | 23 |
| 8.5 | 0.100, 0.310 | 9 | N/A | N/A | N/A | N/A | N/A |
| 8.5 | 0.100, 0.220 | 11 | 76.2% | 100.0% | 76.2% | 66.7% | 21 |
| 8.5 | 0.100, 0.220 | 12 | 76.2% | 100.0% | 76.2% | 52.4% | 21 |
| 8.5 | 0.100, 0.220 | 13 | 76.2% | 95.2% | 66.7% | 52.4% | 21 |

Table 2 above shows the corresponding key vision and comfort subjective ratings from the wearers of the lenses discussed earlier in Tables 1-A and 1-B. Table 2 presents these subjective ratings as the percentage of wearers exceeding a cut-off value, for example, the percentage of wearers in which the near vision value equaled or exceeded 67. The numerical parameter of the cut-off value (for example, 67 for near vision) can be derived from any known or acceptable methodology, for example, that discussed in the publication *Woods* et. al., Visual Performance of a Multifocal Contact Lens versus Monovision in Established Prototypes, OPTOMETRY AND VISION SCIENCE, Vol. 92, No. 2, (February 2015) (see Table 4, page 5), the contents of which are incorporated by reference herein in their entirety. For example, a Table 2 percentage of 50% would mean the average subjective scores for the lenses disclosed herein were the same as the commercial lenses tested in Woods. A percentage greater than 50% would mean more than 50% of the subjective scores for the disclosed lenses exceeded the average scores of the lenses tested in Woods. A Table 2 percentage close to 100% would mean almost all subjective scores for the disclosed lenses were higher than the average scores of the lenses tested in Woods. Table 2 therefore provides an indication of the change in success rate with each of the different designs tested in the above study, and compares those designs to a commercial lens to show the success of the disclosed lens.

To summarize, for the base curves in the 0.220 mm peripheral thickness design, the preferable base curve was the 8.1 mm base curve based on the objective measures discussed above with respect to Table 1-A and 1-B. One unexpected finding was the subjective ratings in Table 2 were higher with Designs 11, 12 and 13 in the 8.5 mm base curve, reaching 76% for distance vision, close to 100% for near vision, and close to 76% overall.

For the 0.310 mm designs, both the 8.3 mm and 8.1 mm base curves were preferable based on the objective measures discussed above with respect to Tables 1-A and 1-B. In the subjective ratings of Table 2, these ratings were highest with Design 24 having the 8.3 mm base curve and Design 21 having the 8.1 mm base curve. The subjective ratings were 90 to 95% for distance, near and overall ratings for these samples. One unexpected finding was how much better the performance was compared to the 0.220 mm peripheral thickness lens designs and compared to the commercial lens tested in Woods.

The results of the testing for Tables 1-A and 1-B, and Table 2, was the discovery of ranges for a lens geometry that can meet all the physical design criteria of a comfortable and well fitted soft contact lens on a wide range of eye shapes. Also, in some instances, the acceptable ranges of the lenses kept the center of the lens as close as practical to the pupil center or line of sight of the eye.

TABLE 3-A

Lens Diameter Range Chart

| Base Curve/Diameter | Thickness - Center, Peripheral | Test Number | Movement With Blink | Primary Gaze Lag | Up Gaze Lag |
|---|---|---|---|---|---|
| 8.5/14.3 | 0.100, 0.220 | 10 | N/A | avg 0.18 mm, 0% >0.3 mm | avg 0.42 mm, 76% >0.3 mm |
| 8.5/14.5 | 0.100, 0.220 | 12 | N/A | avg 0.18 mm, 0% >0.3 mm | avg 0.41 mm, 62% >0.3 mm |
| 8.3/14.5 | 0.120, 0.310 | 24 | avg 0.19 mm, 0% 0.0 mm movement | avg 0.11 mm, 0% >0.3 mm | avg 0.20 mm, 0% >0.3 mm |

TABLE 3-B

Lens Diameter Range Chart

| Test Number | Decentration - Vertical | Decentration - Horizontal | Lens Buckling/Fluting | Optical Distortion | Result Summary | Sample Size |
|---|---|---|---|---|---|---|
| 10 | avg 0.14 mm, 0% >0.3mm | avg 0.13 mm, 5% >0.3mm | 0 | 0 | 0% too loose or tight | 38 eyes |
| 12 | avg 0.08 mm, 5% >0.3mm | avg 0.20 mm, 21% >0.3mm | 0% | 0% | 0% too loose or tight | 42 eyes |
| 24 | avg 0.00 mm, 0% >0.3mm | avg 0.09 mm, 0% >0.3mm | 0% | 0% | 0% too loose or tight | 52 eyes |

Tables 3-A and 3-B above are similar to Tables 1-A and 1-B and show the different base curve and diameter combinations that were fabricated, measured, verified, and tested clinically. The 8.5 mm base curve lenses having diameters of 14.3 mm (sag of 3.90 mm) and 14.5 mm (sag of 4.05 mm) were tested with respective center and peripheral thicknesses of 0.100 and 0.220 mm. These two designs performed similarly for lag and centration. By comparison, the thicker 0.120/0.310 mm central/peripheral thickness lens with an 8.3 mm base curve and 14.5 mm diameter had less lag and decentration in all measures and no buckling, optical distortion or tightness problems. The designed sag of these lenses was just greater than 4.25 mm. This combination of sagittal diameter and base curve, or sag, had an unexpected synergistic effect of improving the lens fitting and meeting one design objective to keep the center of the lens, where the center of the induced aperture is located, as close as practical to the pupil center or line of sight of the eye.

TABLE 4

Subjective Data for 8.3 mm and 8.5 mm Base Curve

| Base Curve/ Diameter | Thickness- Center, Peripheral | Test Number | Distance Vision (% >=84) | Near Vision (% >=67) | Overall Vision (% >=76) | Comfort (% >=92) | Sample Size (subjects) |
|---|---|---|---|---|---|---|---|
| 8.5/14.3 | 0.100, 0.220 | 10 | 84.2% | 89.5% | 63.2% | 63.2% | 19 |
| 8.5/14.5 | 0.100, 0.220 | 12 | 76.2% | 100.0% | 76.2% | 52.4% | 21 |
| 8.3/14.5 | 0.120, 0.310 | 24 | 95.7% | 95.7% | 95.7% | 73.9% | 23 |

The significance of the unexpected synergistic effect can be seen in Table 4 above. Moving from the 8.5 mm base curve having a 14.3 mm diameter to the 14.5 mm diameter had a mixed but somewhat positive effect. Distance vision and comfort were not as good for the 14.5 mm diameter samples but near vision and overall vision were better in the 14.5 mm diameter samples. Moving from the thinner lens having a 8.5 mm base curve and 14.5 mm diameter to the thicker lens having an 8.3 mm base curve and 14.5 mm diameter improved all but near vision, which was already optimal at close to 100%.

TABLE 5-A

Lens Thickness Range Chart

| Base Curve | Thickness - Center, Peripheral | Test Number | Movement With Blink | Primary Gaze Lag | Up Gaze Lag |
|---|---|---|---|---|---|
| 8.5 | 0.100, 0.220 | 11 | N/A | avg 0.19 mm, 7% >0.3 mm | avg 0.47 mm, 64% >0.3 mm |
| 8.5 | 0.100, 0.220 | 12 | N/A | avg 0.18 mm, 0% >0.3 mm | avg 0.41 mm, 62% >0.3 mm |
| 8.5 | 0.100, 0.220 | 13 | N/A | avg 0.19 mm, 0% >0.3 mm | avg 0.41 mm, 52% >0.3 mm |
| 8.5 | 0.100, 0.310 | 9 | N/A | avg 0.14 mm, 0% >0.3 mm | avg 0.37 mm, 71 >0.3 mm |
| 8.3 | 0.100, 0.220 | 14 | N/A | avg 0.14 mm, 0% >0.3 mm | avg 0.34 mm, 36% >0.3 mm |
| 8.3 | 0.120, 0.310 | 16 | N/A | avg 0.14 mm, 0% >0.3 mm | avg 0.33 mm, 39% >0.3 mm |
| 8.3 | 0.120, 0.310 | 24 | avg 0.19 mm, 0% 0.0 mm movement | avg 0.11 mm, 0% >0.3 mm | avg 0.20 mm, 0% >0.3 mm |
| 8.1 | 0.120, 0.220 | 15 | N/A | avg 0.14 mm, 0% >0.3 mm | avg 0.31 mm, 39% >0.3mm |
| 8.1 | 0.120, 0.310 | 17 | avg 0.09 mm, 16% 0.0 mm movement | avg 0.05 mm, 0% >0.3 mm | avg 0.17 mm, 2% >0.3 mm |
| 8.1 | 0.120, 0.310 | 21 | avg 0.11 mm, 0% 0.0 mm movement | avg 0.12 mm, 0% >0.3 mm | avg 0.21 mm, 8% >0.3 mm |
| 8.1 | 0.120, 0.310 | 22 | avg 0.11 mm, 0% 0.0 mm movement | avg 0.07 mm, 0% >0.3 mm | avg 0.21 mm, 8% >0.3 mm |
| 7.9 | 0.120, 0.220 | 18 | avg 0.10 mm, 10% 0.0 mm movement | avg 0.07 mm, 0% >0.3 mm | avg 0.22 mm, 0% >0.3 mm |
| 7.9 | 0.120, 0.310 | 19 | avg 0.08 mm, 26% 0.0 mm movement | avg 0.06 mm, 0% >0.3 mm | avg 0.19 mm, 0% >0.3 mm |

TABLE 5-B

Lens Thickness Range Chart

| Base Curve | Decentration - Vertical | Decentration - Horizontal | Lens Buckling/ Fluting | Optical Distortion | Results Summary | Sample Size |
|---|---|---|---|---|---|---|
| 8.5 | avg 0.10 mm, 5% >0.3 mm | avg 0.30 mm, 31% >0.3 mm | 0% | 0% | 7% too loose or decentered | 42 eyes |
| 8.5 | avg 0.08 mm, 5% | avg | 0% | 0% | 0% too loose or tight | 42 eyes |
| 8.5 | avg 0.10 mm, 5% >0.3 mm | avg 0.25 mm, 21% >0.3 mm | 0% | 0% | 2% decentered | 42 eyes |

TABLE 5-B-continued

Lens Thickness Range Chart

| Base Curve | Decentration - Vertical | Decentration - Horizontal | Lens Buckling/ Fluting | Optical Distortion | Results Summary | Sample Size |
|---|---|---|---|---|---|---|
| 8.5 | avg 0.08 mm, 0% >0.3 mm | avg 0.19 mm, 11% >0.3 mm | 0% | 0% | 0% too loose or tight | 38 eyes |
| 8.3 | avg 0.07 mm, 3% >0.3 mm | avg 0.18 mm, 13% >0.3 mm | 0% | 0% | 0% too loose or tight | 76 eyes |
| 8.3 | avg 0.08 mm, 6% >0.3 mm | avg 0.21 mm, 19% >0.3 mm | 0% | 0% | 0% too loose or tight | 62 eyes |
| 8.3 | avg 0.00 mm, 0% >0.3 mm | avg 0.09 mm, 0% >0.3 mm | 0% | 0% | 0% too loose or tight | 52 eyes |
| 8.1 | avg 0.06 mm, 6% >0.3 mm | avg 0.16 mm, 16% >0.3 mm | 0% | 0% | 0% too loose or tight | 62 eyes |
| 8.1 | avg 0.00 mm, 0% >0.3 mm | avg 0.16 mm, 0% >0.3 mm | 0% | 0% | 0% too loose or tight | 50 eyes |
| 8.1 | avg 0.00 mm, 0% >0.3 mm | avg 0.16 mm, 0% >0.3 mm | 0% | 0% | 0% too loose or tight | 36 eyes |
| 8.1 | avg 0.00 mm, 0% >0.3 mm | avg 0.12 mm, 0% >0.3 mm | 0% | 0% | 0% too loose or tight | 36 eyes |
| 7.9 | avg 0.00 mm, 0% >0.3 mm | avg 0.17 mm, 0% >0.3 mm | 0% | 2% | 4% too tight | 50 eyes |
| 7.9 | avg 0.00 mm, 0% >0.3 mm | avg 0.17 mm, 0% >0.3 mm | 0 | 0 | 6% too tight | 50 eyes |

Tables 5-A and 5-B are similar to Tables 1-A and 1-B, and 3-A and 3-B. Tables 5-A and 5-B highlight the contrast between the different thicknesses tested in each base curve. The peripheral region was chosen to thicken the lens. At the chosen 12.3 mm sagittal diameter, the lens is past the average horizontal visible iris diameter of 11.5 mm and over the anatomical limbus of the eye. When a wearer blinks the lens onto their eye, this is the area of greatest translation (or "x") in Hooke's Law. This translation (x), thickness and modulus of the hydrated soft contact material (k), and the suction created under the lens can be understood by Hooke's law; the force required to stretch a spring is directly proportional to the amount of stretch. While the hydrated polymer in a soft contact lens material may not be perfectly elastic and linear, the basic proportional relationship holds. The force has the form of $F=-k*x$ where k is the spring constant which comes from the rigidity of the hydrated contact lens material and thickness, and x is the translation or displacement from before to after blinking onto the eye. The suction is the stored energy from the work done by the eyelids blinking the lens onto the eye and has the form $W=-1/2\ k*x^2$. The result is small changes in the lens thickness profile in this peripheral region have the most significant change on the stored energy and lens fitting.

In general, the thicker lenses reduced lens movement with a blink, reduced lens lag and reduced decentration in primary gaze when used with the 8.1 to 8.3 mm base curves. This is because the thicker lens had more stored energy in the form of suction under the lens when blinked onto the eye and this suction increased more, relative to the thinner profile, when the lens is blinked, lags, or is held by the eyelids further from the center of the visible iris. This "band" or annulus of increased thickness also helps improve centration purely by elastic deformation as the lens is displaced from the center of the cornea. The result is a lens design matched to the material properties of the molded etafilcon 58% lenses with reduced movement, yet still moving with a blink, that resists decentration in primary gaze and lens lag with change in gaze.

TABLE 6

Subjective Data for 7.9 mm-8.5 mm Base Curve

| Base Curve | Thickness-Center, Peripheral | Test Number | Distance Vision (% >=84) | Near Vision (% >=67) | Overall Vision (% >=76) | Comfort (% >=92) (subjects) | Sample Size |
|---|---|---|---|---|---|---|---|
| 8.5 | 0.100, 0.220 | 11 | 76.2% | 100.0% | 76.2% | 66.7% | 21 |
| 8.5 | 0.100, 0.220 | 12 | 76.2% | 100.0% | 76.2% | 52.4% | 21 |
| 8.5 | 0.100, 0.220 | 13 | 76.2% | 95.2% | 66.7% | 52.4% | 21 |
| 8.5 | 0.100, 0.310 | 9 | N/A | N/A | N/A | N/A | N/A |
| 8.3 | 0.100, 0.220 | 14 | 67.7% | 87.1% | 71.0% | 74.2% | 31 |
| 8.3 | 0.120, 0.310 | 16 | 64.5% | 90.3% | 61.3% | 67.7% | 31 |
| 8.3 | 0.120, 0.310 | 24 | 95.7% | 95.7% | 95.7% | 73.9% | 23 |
| 8.1 | 0.120, 0.220 | 15 | 58.1% | 87.1% | 61.3% | 64.5% | 31 |
| 8.1 | 0.120, 0.310 | 17 | 68.0% | 100.0% | 76.0% | 64.0% | 25 |
| 8.1 | 0.120, 0.310 | 21 | 94.4% | 94.4% | 88.9% | 72.2% | 18 |
| 8.1 | 0.120, 0.310 | 22 | 66.7% | 83.3% | 72.2% | 66.7% | 18 |
| 7.9 | 0.120, 0.220 | 18 | 60.0% | 76.0% | 56.0% | 56.0% | 25 |
| 7.9 | 0.120, 0.310 | 19 | 52.0% | 60.0% | 48.0% | 52.0% | 25 |

As shown above in Table 6, the thicker lens design profiles are thicker in the center by 0.020 mm as compared to the thinner lenses in Table 6. This thickness difference is intended to reduce the slight central stress from the suction under the lens with some wearers finding the vision better. This is shown by the thicker Designs 17, 21 and 22 having an 8.1 mm base curve showing better vision ratings compared to the thinner Design 15 having an 8.1 mm base curve.

Another control point in the thickness profile is the edge thickness. In some examples, and without limitation, a substantially spherical back surface geometry and a radial edge thickness of 0.145 mm at 0.3 mm in from the lens edge provided good comfort over a wider range of base curves. By using a thin edge, which is not lifted from the conjunctiva of the eye, there is minimal physical interaction between the eye lids, lens edge and conjunctiva. This produces less mechanical discomfort for the wearer of the lens and further reduces the propensity of the eyelids to decenter and move the contact lens. When the base curve is steeper (for example, in the 7.9 mm designs) or flatter (for example, in the 8.5 mm designs) the comfort reduces to just better than the commercial lenses benchmarked in the Woods publication discussed above. Outside the 7.9-8.5 mm base curve range, the comfort would decline to unacceptable levels. In the preferable 8.1 mm to 8.3 mm base curves the comfort is unexpectedly better at around 70% of lenses exceeding the average comfort in Woods.

The tested lenses had a power profile similar to that shown in FIG. 1, for example, having an induced aperture, and the disclosed ranges are not exact due to manufacturing tolerances and accepted optical performance at surrounding parameters. For example, the base curve can be ±0.2 mm from the disclosed parameter without substantially affecting its performance as provided by the ANSI tolerance of 0.2 mm. The disclosed thicknesses can be ±0.010 mm, based on accepted scientific tolerances. These tolerances are one example of insubstantial differences between the disclosed ranges and a similar lens design. For example, a lens having a base curve of 8.7 mm would be insubstantially different than the disclosed range of 7.9 mm to 8.5 mm given the ±0.2 mm base curve tolerance.

A single study was conducted with a silicone hydrogel material in a non-optimized geometry of an 8.4 mm base curve and a sagittal diameter of 14.0 mm. This equates to a sag of 3.7 mm. A preferable power profile found to work best on lathe-cut polymacon 38% lenses (11F, +2.375D) was used in this trial with silicon hydrogel material lenses. These lenses were assessed as fitting slightly loose; excessive movement with a blink and decentration. Lenses decentered from 0.11 to 1.05 mm from the pupil center with an average decentration of 0.42 to 0.49 mm. This is considerably more decentration than the lathe-cut polymacon 38% lenses, and the optimized molded etafilcon 58% lenses, the latter being an average of about 0.20 mm.

This increased movement and decentration moved the induced aperture from the center of the pupil or line of sight too far and for too long a period of time. Vision was reduced compared to spectacle visual acuity by about one line on a letter chart as the lens moved too much on the eye. In this study, 45% (9 of the 20 wearers) said they would likely or very likely continue to wear the lenses if they were available. By comparison, in the preferable etafilcon 58% lenses, 91% (40 of the 44 wearers) said they would likely or very likely continue to wear the lenses if they were available.

In this case the lenses with their fabricated thickness profiles and edge design using a combination of 8.4 mm base curve and diameter of 14.0 mm were too "loose" or "flat fitting" of a design. However, the present inventors discovered that neither the 8.4 mm base curve or the 14.0 mm diameter alone caused the negative results; rather, the combination of the two that yielded the lower 3.7 mm sag is why the lenses were too "loose" or "flat fitting."

As shown above, the inventors discovered induced aperture lenses to generally be neither too tight nor too loose when the base curve is a radius between 7.9 mm and 8.5 mm, preferably 8.1 to 8.3 mm. Further, the inventors discovered a well-fitting lens with a diameter between 14.0-14.5 mm, preferably 14.3 to 14.5 mm, OR a sag of 3.7 mm to 4.75 mm, preferably 3.9 mm to 4.75 mm, and more preferably 4.05 mm to 4.50 mm. Outside of these ranges, the inventors discovered the performance and fit of the lens to decline unexpectedly, showing the criticality of these ranges. Further advantageous ranges were discovered, for example, a thickness profile having a center thickness between 0.100-0.120 mm and a peripheral thickness of 0.220-0.310. The above ranges are subject to accepted tolerances, for example, those accepted within the scientific community or provided by ANSI.

Optical Power Verification

Another aspect of the present invention utilizes optical power verification to ensure the function of the disclosed lens and to correct the measured clinical refractive error in the eyes of a user. The inventors performed clinical trials and determined an algorithm to best verify the function of induced aperture lenses and to correct the eye's measured clinical refractive error. This method involves a commercial optical power measurement instrument to measure soft contact lens power profiles in a saline solution. By submerging the lenses in a saline solution, the lenses are maintained in a uniform hydrated state to obtain more accurate power profiles. An algorithm was then developed using this procedure.

Figure 4:
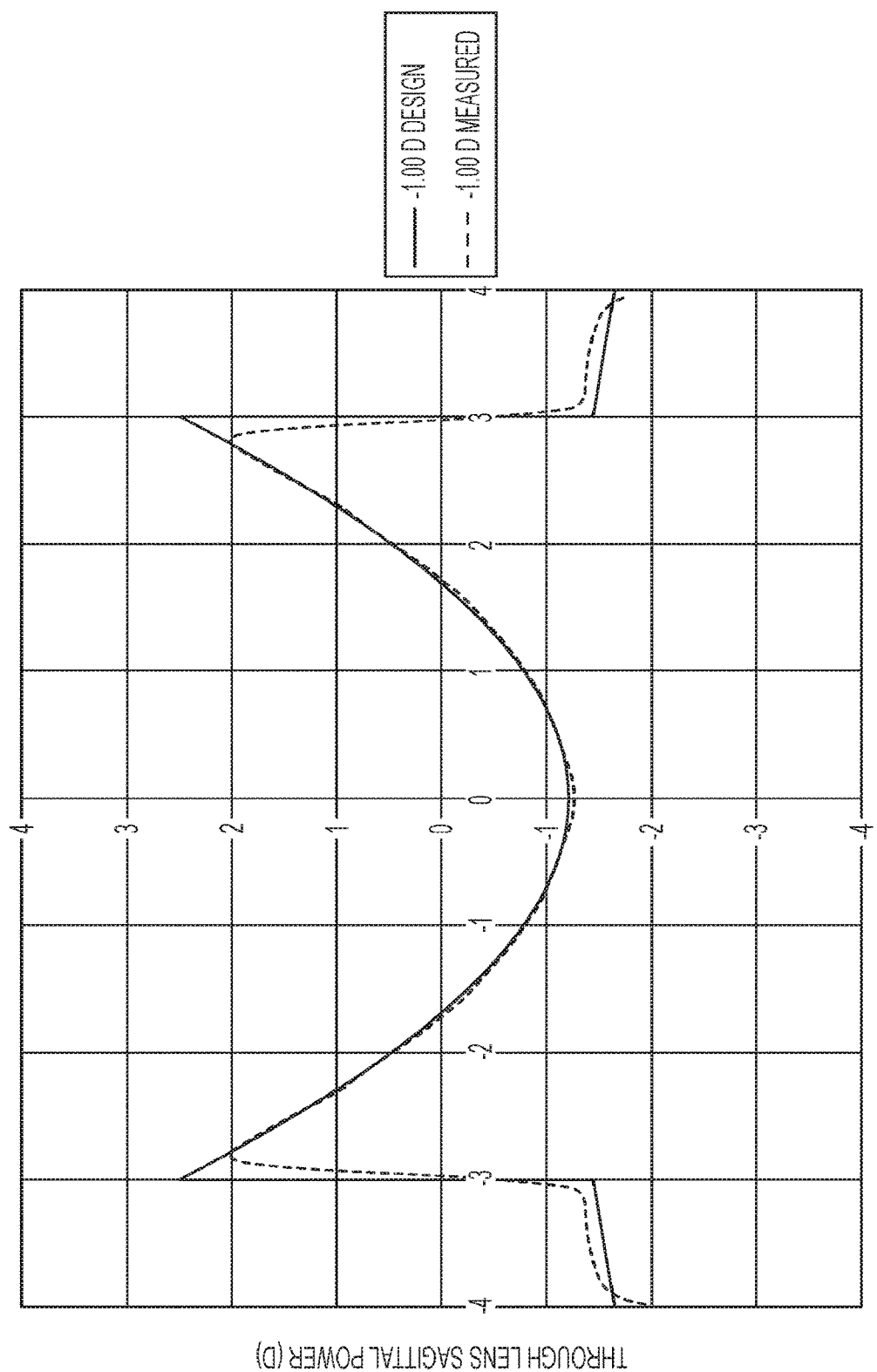
FIGS. 4-6 are plots of through lens sagittal power profiles according to embodiments of the present application.
Figure 5:
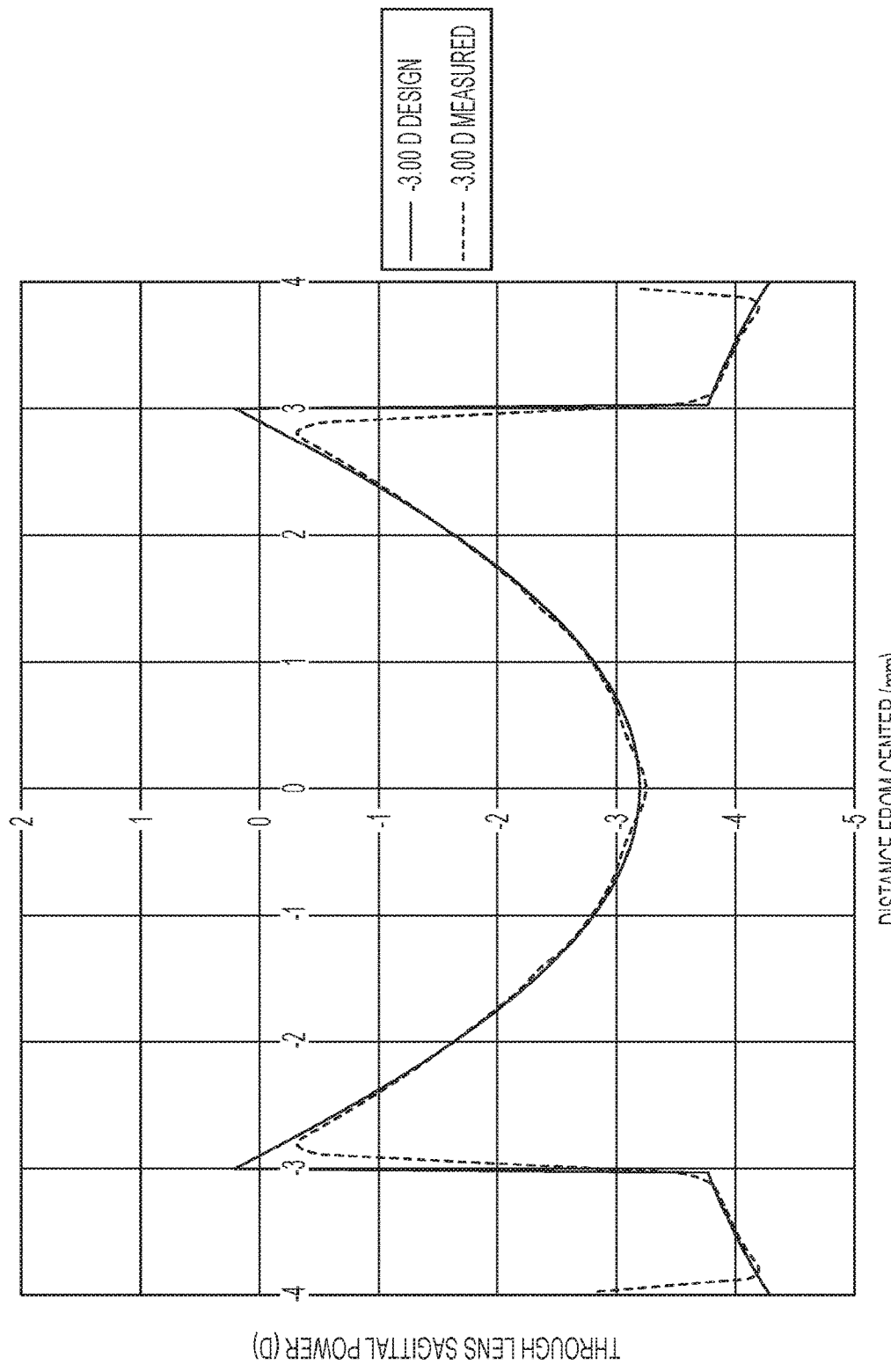
Figure 6:
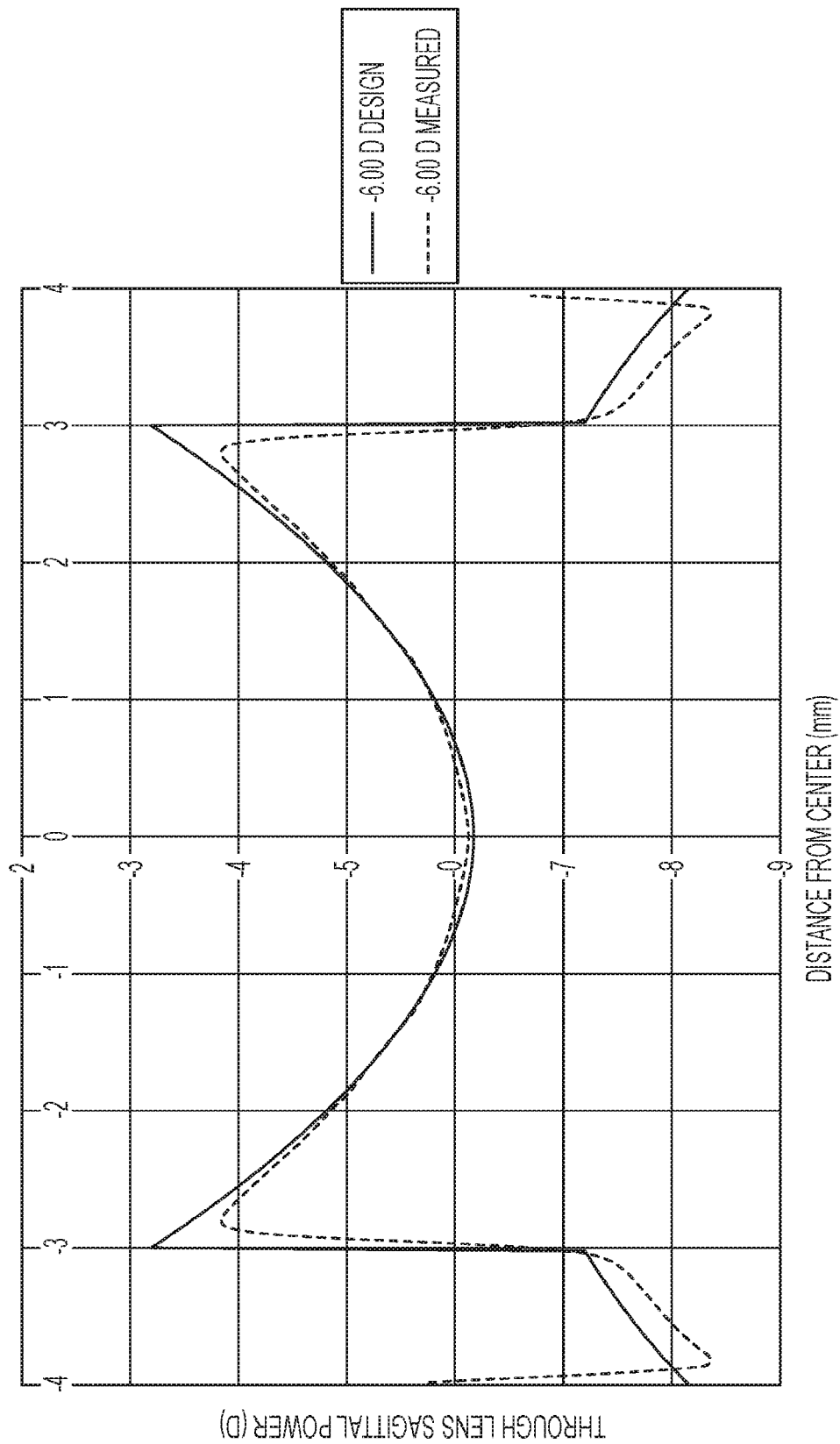

The inventive verification method and verified lens improve the correlation between the disclosed lenses with an induced aperture and a conventional ophthalmic lens having a labeled power. For example, by using the verification method disclosed herein, a lens can be measured and verified to correspond to a labeled power of −2.25 D for a typical lens. As shown in FIGS. 4-6, the power at the apex of the lens is not necessarily the same as the labeled power, so a method can be used to ensure a lens having an induced aperture can be used on a patient needing a lens having a specific labeled power, in the above example, −2.25 D.

This verification method, and lens subjected to the verification method, can communicate the necessary labeled power to a clinician, doctor, or wearer of the lens. For example, the lens can be verified and the labeled power inscribed, printed, or otherwise written onto a container or package of the lens. As used herein, "package" is not intended to be limited to the package directly enclosing the lens with solution therein, but any package, label, insert, or writing that accompanies the lens when distributed to a doctor, clinician, or wearer.

The design of an induced aperture lens is developed by determining the amount of power change on the front surface required to induce an aperture. Verifying the front surface power change is a challenge because commercially available equipment for performing this measurement on contact lenses is not available. It was therefore helpful to re-define the design in terms of a through-lens power profile which could then be verified using commercially available equipment.

Figure 2:
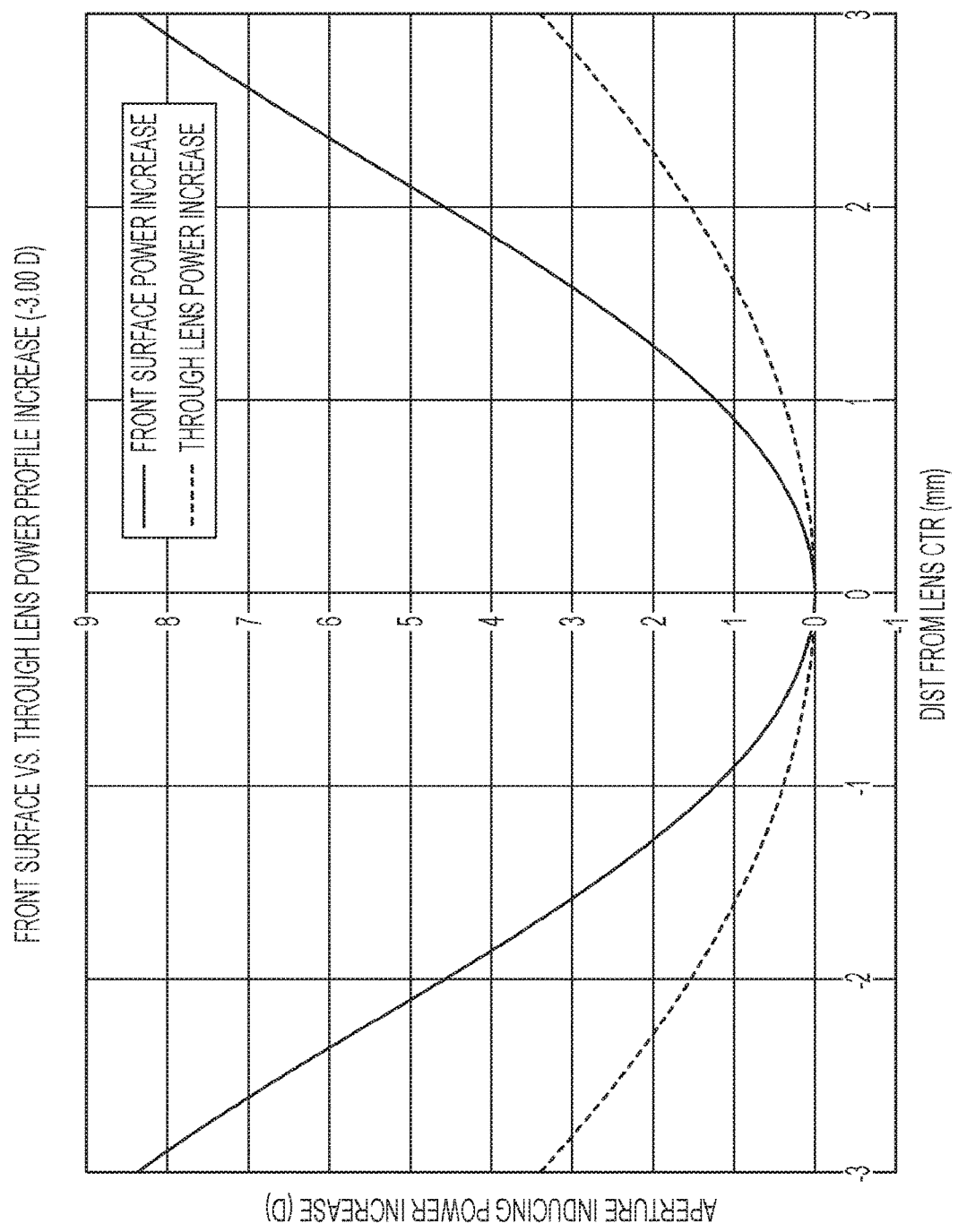
FIG. 2 is a plot of a front surface vs. through lens power profile increase for a −3.00 diopter lens according to embodiments of the present application.

To convert from a front surface tangential power profile to a through lens sagittal power profile, a ray tracing algorithm was developed to calculate the intersection of light rays refracted through the theoretical finished lens with the optical axis. This calculation, based on Snell's Law, is performed for several points along the diameter of the optical zone (in some examples, the step size is around 0.006 mm). The discrete focal lengths are then converted to power by calculating the inverse of the focal lengths. The power values can then be graphed to obtain the through lens sagittal power profile. FIG. 2 illustrates the curvature for a front surface vs. through lens power profile increase for a −3.00 diopter lens.

The inventive algorithm involves measuring the ramp up in power required to produce the optimized induced aperture. The algorithm was developed based on the difference between the reading at the central 2.0 mm region (i.e., about 2.0 mm from the apex) and the readings for the annular region between about 2.0 and 4.0 mm from the apex. As shown below, the inventive algorithm calculates a "distance power" or labeled power near the apex of the lens as the area weighted average radial sagittal power integrated over the central 2 mm diameter of the lens. This could be, for example, the power a doctor or clinician determines to be the appropriate power for a user to have clear vision. The aperture inducing power discussed below can be the power that produces a blur anywhere within the 2.0-4.0 mm radius.

Distance Power (Labeled Power)—Area weighted arithmetic average radial sagittal power integrated over, for example, the central 2 mm diameter of the lens $$Dist\ Power = \frac{\sum_{r=0}^{1}(P(r)*(2\pi r))}{\sum_{r=0}^{1}(2\pi r)}$$

(where P(r) is the sagittal power as a function of the radius (r) from lens center)

Aperture Inducing Power—The difference between the area weighted arithmetic average radial sagittal power integrated over, for example, an annular region between 2 and 4 mm diameter, and the distance power.

$Aper.\ Induc.\ Power =$ $$\frac{\sum_{r=0}^{2}(P(r)*(2\pi r)) - \sum_{r=0}^{1}(P(r)*(2\pi r))}{\sum_{r=0}^{2}(2\pi r) - \sum_{r=0}^{1}(2\pi r)} - Dist\ Power$$

(where P(r) is the sagittal power as a function of the radius (r) from lens center)

Figure 3:
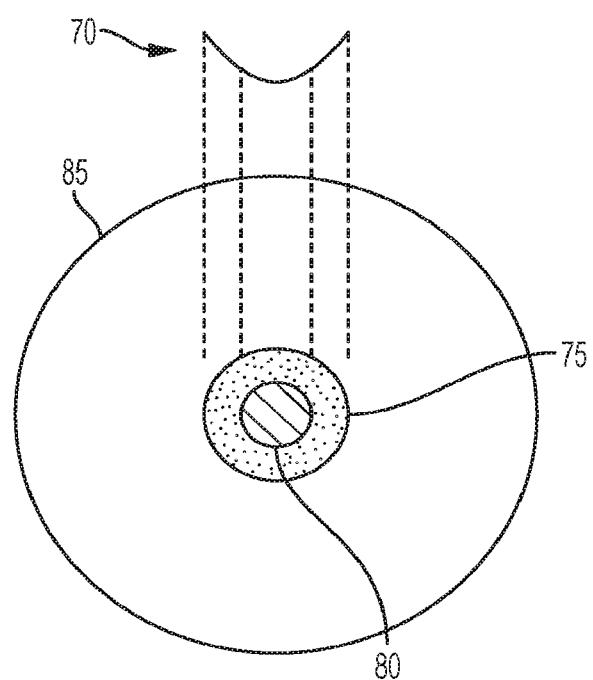
FIG. 3 is a schematic illustration of a lens having a power profile projected onto an eye according to embodiments of the present application.

The distance power and aperture inducing power are also shown in FIG. 3. FIG. 3 illustrates a power profile 70 with respect to the aperture inducing power region 75 and the distance region 80 of the lens. The lens diameter 85 is also shown. Based on the calculations above, an exemplary zone diameter is 2 mm for the distance power and between 2-4 mm for the aperture inducing power. However, during clinical testing, the distance and aperture inducing zone diameters were adjusted according to the following rules without substantial deviation in success rate:

Range of distance zone diameter=2-3 mm

Exemplary minimum annular aperture inducing zone width=1 mm

Maximum diameter for power profile calculations=6 mm

As shown below, determining the distance power and aperture inducing power in this manner produced a lens profile with great success that matched the target profile with great accuracy.

Many different contact lens power measurement devices were evaluated to determine suitability for measuring the through lens power profile of the disclosed lenses. The NIMO TR-1504 (NIMO) Power Measurement device was chosen for its accuracy in measuring the VTI lens design. The NIMO is a wavefront sensor manufactured by Lambda-X®.

FIGS. 4-7 illustrate the through lens sagittal power profiles for three separate lenses respectively representing low, medium, and high power lenses for which the present method is utilized. In these examples, the calculations of distance power and aperture inducing power were performed within the central 4.0 mm (within 2.0 mm of the apex) on the graphs. As shown, the disclosed method resulted in excellent agreement between the designed and measured profiles for all three powers highlighting the precision of the disclosed method for ensuring a correct power profile.

For example, a gage repeatability and reproducibility (GR&R) analysis was performed using the NIMO where ten lenses were measured three times each by three different operators in the low, mid, and high powers. The results of this study are summarized below.

TABLE 7

Power Tolerance: ±0.25 D (or 0.50 D total)

|  | −1.00 Avg Pwr | −3.00 Avg Pwr | −6.00 Avg Pwr |
| --- | --- | --- | --- |
| Total Gage | 45.14 | 34.43 | 44.13 |
| Repeatability | 45.14 | 33.43 | 42.50 |
| Reproducibility | 0.00 | 8.21 | 11.91 |

TABLE 8

Average Aperture Inducing Power Tolerance: ±0.13 D (or 0.26 D total)

|  | −1.00 Average Aperture Inducing Power | −3.00 Average Aperture Inducing Power | −6.00 Average Aperture Inducing Power |
| --- | --- | --- | --- |
| Total Gage | 62.39 | 48.69 | 36.25 |
| Repeatability | 62.39 | 47.42 | 36.25 |
| Reproducibility | 0.00 | 11.05 | 0.00 |

Per ISO 18369-2:2012, section 5, the reproducibility of the power measurement method should be "better than one-half the tolerance limit specified for the property." As shown above, the calculated reproducibility for all powers tested in this study was under 50% and therefore met the requirements of ISO 18369-2:2012.

To select the power of a spherical (non-astigmatic correction) soft contact lens, two corrections or calculations are accepted as standard clinical practice. First, the power can be adjusted from the spectacle plane to the corneal plane. This is called the vertex distance adjustment. Second, the sphere and cylinder meridians of the vertex distance adjusted refraction are averaged to a single sphere equivalent power.

The vertex distance adjusted sphere equivalent subjective refraction is the clinical estimate or starting point for selection of the soft contact lens power. In clinical trials, eighteen patients (36 eyes) were analyzed and conventional subjective refractions were performed. The vertex distance adjusted sphere equivalent subjective refractions were calculated and compared to the 2.0 mm average measured power algorithm using a Lambda-X NIMO instrument. FIG.

7 shows the linear regression comparing these two powers. The "DISPENSED" lens power plot is a linear regression of the best soft contact lens power after a short-term, in-office, evaluation. The "FINAL" lens power plot is a linear regression of the measure lenses after a period of 21 days of wearing the lens outside.

Figure 7:
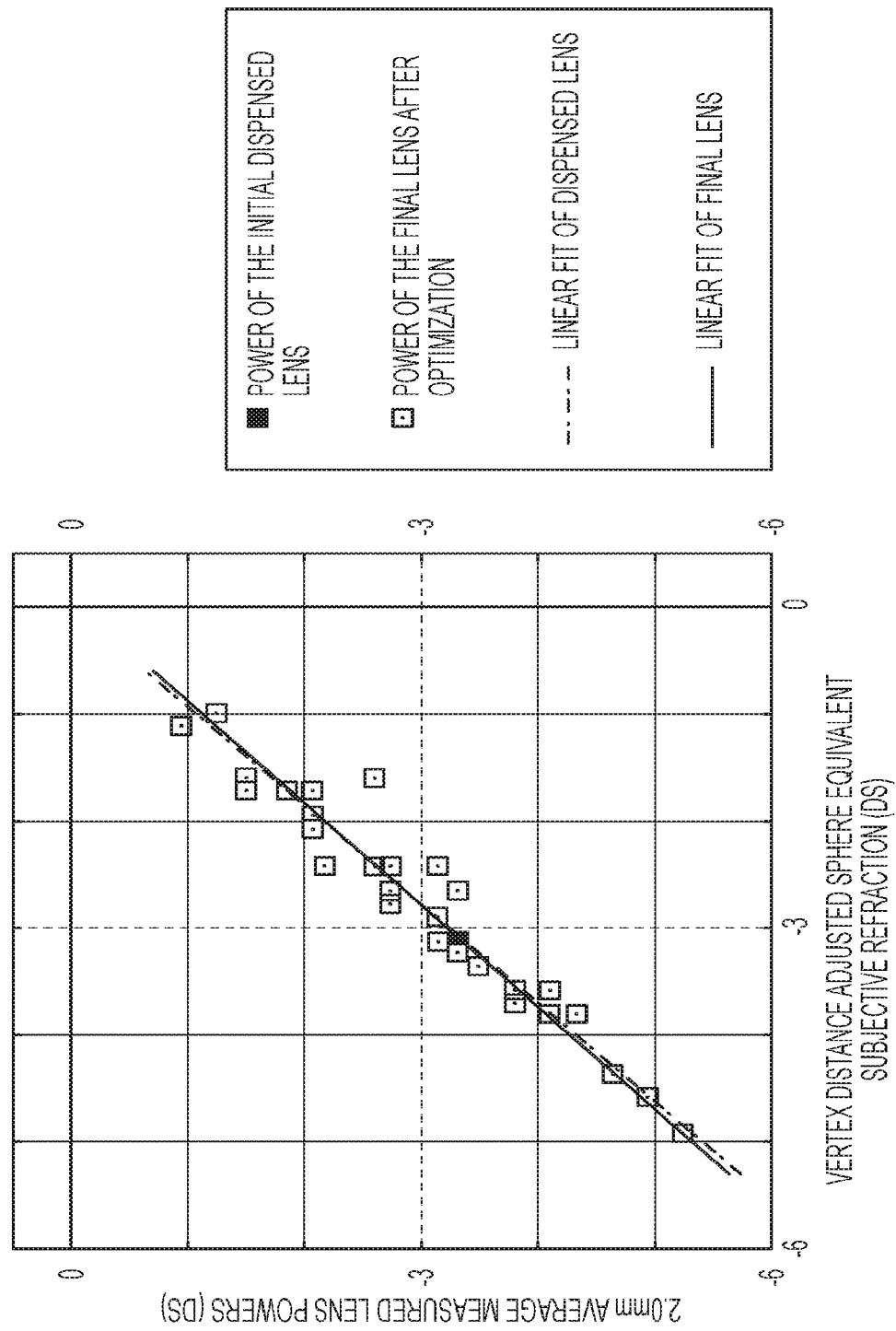
FIG. 7 is a linear regression plot of the subjective refraction and measured lens powers according to embodiments of the present application.

As shown in FIG. 7, the agreement between the "DISPENSED" clinical refraction estimate and the "FINAL" measured lens power is high. The "R" values for determining the agreement between a plot and its corresponding linear regression are greater than 0.97, which means that greater than 94% (R squared=0.94) of the variation in the labelled lens power can be predicted from the subjective refraction. The relationship between the estimated DISPENSED lens and the actual FINAL lens is linear to 5 and 8% error with a standard deviation of the difference of 0.25 D.

As discussed above, the inventive algorithm is applied to the use of a specific type of optical lens, namely, one with an induced aperture. The inventive algorithm is not an algorithm per se, but one applied in a meaningful way so as not to monopolize the entire algorithm. For example, the algorithm is tied to a machine in that it is tied to a lens having an induced aperture. Further, it is not applied with respect to any sort of naturally occurring composition or natural phenomena, but rather with respect to a man-made optical lens having an induced aperture. The above invention can further be a lens itself that is verified according to the above method, or a combination of package identified with a labeled power and a lens verified according to the above method.

Lens Having a Single Power Profile for Multiple Presbyopes

As discussed above, the present invention also involves, in some embodiments, a single lens that can be applied to a wide range of presbyopes. The prior art lenses required a determination of which "add power" best fits the individual wearer's visual needs. The typical presbyope initially requires a low add power at a young age (45 years on average and +1.00D in spectacles) with a greater add power required at an older age until all accommodative ability is lost (at 65 years on average and +2.50D in spectacles). Through clinical testing, the present inventors unexpectedly discovered that a single power profile could induce a single optical aperture with enough depth of focus to satisfy a wide range of presbyopes. Rather than requiring different power profiles to produce different "add powers" in prior art contact lenses for wearers with different degrees of presbyopia, only one lens need be used for individuals with different degrees of presbyopia.

The data for the single profile/aperture lenses is split between studies using polymacon material contact lenses (for example, lathe cut 38% polymacon) and etafilcon material contact lenses (for example, cast molded 58% etafilcon lenses). In general, the disclosed power rise ranges are for the aperture inducing power of the lens. For the exemplary lenses below, the numerical values of ranges are the front surface tangential power rise at the 3 mm diameter (1.5 mm radius) measurement of the lens. At that diameter/radius, the critical range is for a power rise, i.e., a power above and beyond the central power. This range is different for polymacon material contact lenses and cast molded etafilcon lenses. For polymacon material lenses, the critical range is between +2.00 to +2.75 diopters. For etafilcon lenses, the critical range is between +2.375 to +3.125 diopters.

Establishing the range of acceptable profiles was first conducted using lathe-cut polymacon 38% material contact lenses with different fitting characteristics to the later molded etafilcon 58% material contact lenses. In general, less rigid soft contact lens materials and flatter fitting lens designs tend to move more on the eye, requiring a larger induced aperture to provide the intended effects over the center of the pupil or line of sight of the eye. More rigid contact lenses maintain their position better, therefore requiring only a small aperture to provide the intended optical effect.

TABLE 9

Lathed Polymacon Study

| Design # | Aperture inducing power @ Ap Diam (Wet) | Overall Summary |
|---|---|---|
| A1 | 2.75 | Lens has better near vision but distance vision is poor |
| A2 | 2 | Lens has better distance vision but near vision is poor |

With the many variables affecting vision and the need to test lenses when worn on the eye, the clinical outcomes for vision could not be predicted or calculated by someone skilled in the art. Experimental clinical testing was required to discover the critical range of acceptable and unacceptable power profiles.

Many different lens designs were tested in the lathe cut polymacon 38% lenses. They ranged from an 8.1 mm base curve with a 9.2 mm peripheral posterior bevel to an 8.3 mm base curve with a 9.2 mm bevel and a monocurve 8.3 mm spherical and aspherical curvatures.

In the first study above, the design A1 with an aperture inducing power increase of +2.75D was acceptable but very high. This produced a smaller aperture having good depth of focus and near vision while the closely surrounding blur zone restricted more light entering the pupil, thereby reducing distance vision. The lower power profile tested was the design A2 at +2.00D power increase. This produced a larger induced aperture having less depth of focus and near vision while the further out surrounding blur zone restricted less light entering the pupil to thereby improve distance vision. Thus, the general basis of improving the power profile was discovered by changing the induced aperture size and its corresponding directional effect on visual performance.

TABLE 10-A

Lathed Polymacon Summary of Data

| Design # | Inducing Power (Wet) | Overall Objective Vision | Visual Acuity | Contrast Sensitivity | Overall Visual Tasks |
|---|---|---|---|---|---|
| A1 | 2.7500 | Worst | Worst | Worst | Worst |
| A2 | 2 | Middle | | | Best |
| 13F | 2.75 (Hybrid) | Middle | | | Best |
| A1PF | 2.75 | Worst | | | Middle |
| A2PF | 2 | Best | | | Middle |

TABLE 10-A-continued

Lathed Polymacon Summary of Data

| Design # | Inducing Power (Wet) | Overall Objective Vision | Visual Acuity | Contrast Sensitivity | Overall Visual Tasks |
|---|---|---|---|---|---|
| 10F | 2.375 | Middle | | | Middle |
| 11F | 2.3750 | Best | Best | | Best |
| 12F | 2.75 (Hybrid) | Middle | | | Middle |

TABLE 10-B

Lathed Polymacon Summary of Data

| Design # | Visual Tasks | Overall Subjective Vision | Low Illumination Subjective Vision | Halo Disturbance | Overall Satisfaction |
|---|---|---|---|---|---|
| A1 | Worst | Worst | Worst | Worst | Worst |
| A2 | | Best | | | Best |
| 13F | Best | Middle | | | Middle |
| A1PF | | Best | | | Best |
| A2PF | | Middle | | | Middle |
| 10F | | Middle | | | Middle |
| 11F | Best | Middle | | | Middle |
| 12F | | Middle | Best | | Middle |

Tables 10-A and 10-B summarize some of the studies concerning power profiles using polymacon material contact lenses. The table references the Design Number and the aperture inducing power ("Inducing Power"). The remaining cells summarize the comparative visual performance for different tests and the comparative overall satisfaction from the wearer's assessment. The term "hybrid" is meant to describe a power profile shape slightly different from others in this chart.

Design A1 with an aperture inducing power increase of +2.75D was acceptable but not optimum. Design 13F included slight modifications to the A1 design and performed better, as did Designs 13F and 12F. Designs 10F and 11F with aperture inducing power increases of +2.375D were generally the best combination of distance and near vision performance. Designs A2 and A2PF had the lowest aperture inducing power increase of +2.00D and were generally the best for distance and less so for near vision performance. In one trial A2 performed well with wearers requiring a spectacle lower reading addition. To fit a wide range of the presbyopes, which have a wide range of reading additions, the lowest aperture inducing power increase of +2.00D had reduced near vision performance with wearers needing higher reading additions, but was still acceptable. The conclusion from the above tests was the preferable aperture inducing power increase was +2.375, and the range of acceptable aperture inducing power increases was limited to +2.00 to +2.75 inclusive with slight modifications, and the unacceptable power profiles were ≤+2.00D and ≥+2.75D, for these polymacon lenses.

The studies next established the range of acceptable profiles using the etafilcon material contact lenses. The fitting characteristics were better in these lenses as compared to the polymacon lenses, because the etafilcon lenses allowed for testing of different power profiles where the center of the induced aperture is closer to the pupil center or line of sight of the eye. Power profiles that induced smaller apertures could cover the pupil with reduced optical distortions based on the better fit of these lenses. The etafilcon material contact lenses had better fitting characteristics than the polymacon material contact lenses and worked better with higher aperture inducing powers that induced smaller apertures and better near vision with less reduction in distance vision.

Figure 8:
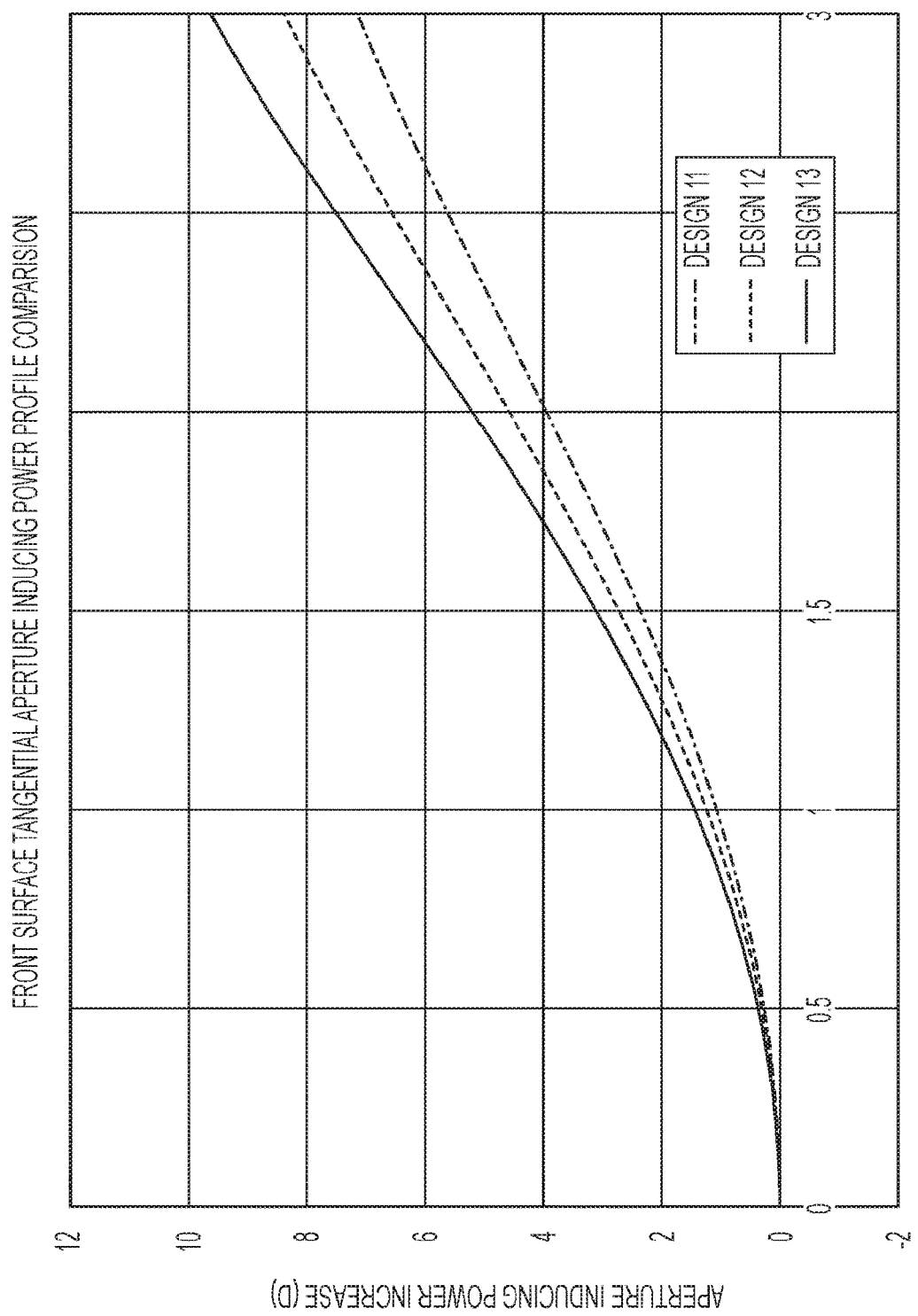
FIG. 8 is a plot of the front surface tangential aperture inducing power profile comparison for several designs according to embodiments of the present application.

FIG. 8 illustrates the designed front surface tangential aperture inducing power profiles for the disclosed lenses. The x-axis of FIG. 8 is the radial distance from the center in mm. The y-axis is the aperture inducing power increase in diopters. Three different aperture inducing power profiles are graphed, including Design 11 (the lowest power increase), Design 12 (the middle power increase), and Design 13 (the highest power increase).

Figure 9:
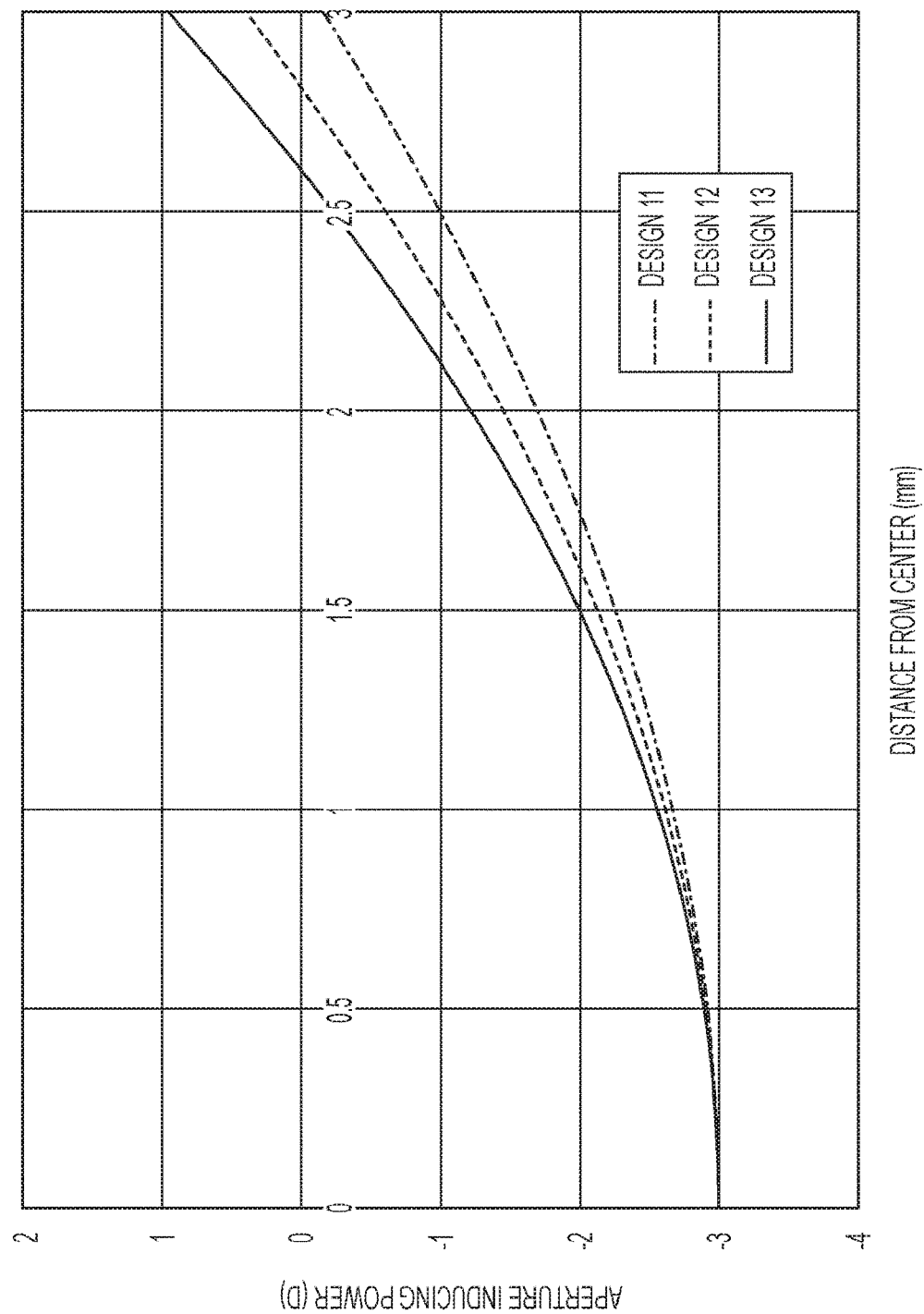
FIG. 9 is a plot of the through lens sagittal aperture inducing power profile comparison according to embodiments of the present application.

FIG. 9 illustrates the through lens sagittal aperture inducing power profile comparison for lenses with an apical power of −3.00D. The x-axis is the radial distance from the center in mm. The y-axis is the instantaneous sagittal power in diopters. The same three aperture inducing power increases are graphed in FIG. 9 as in FIG. 8, that is, Designs 11-13.

TABLE 11

Designs With Scotopic Rings

| Design Number | Aperture Inducing Power Increase (D) |
|---|---|
| 11 | 2.375 |
| 12 | 2.75 |
| 13 | 3.125 |
| 24 | 2.75 |

Figure 10:
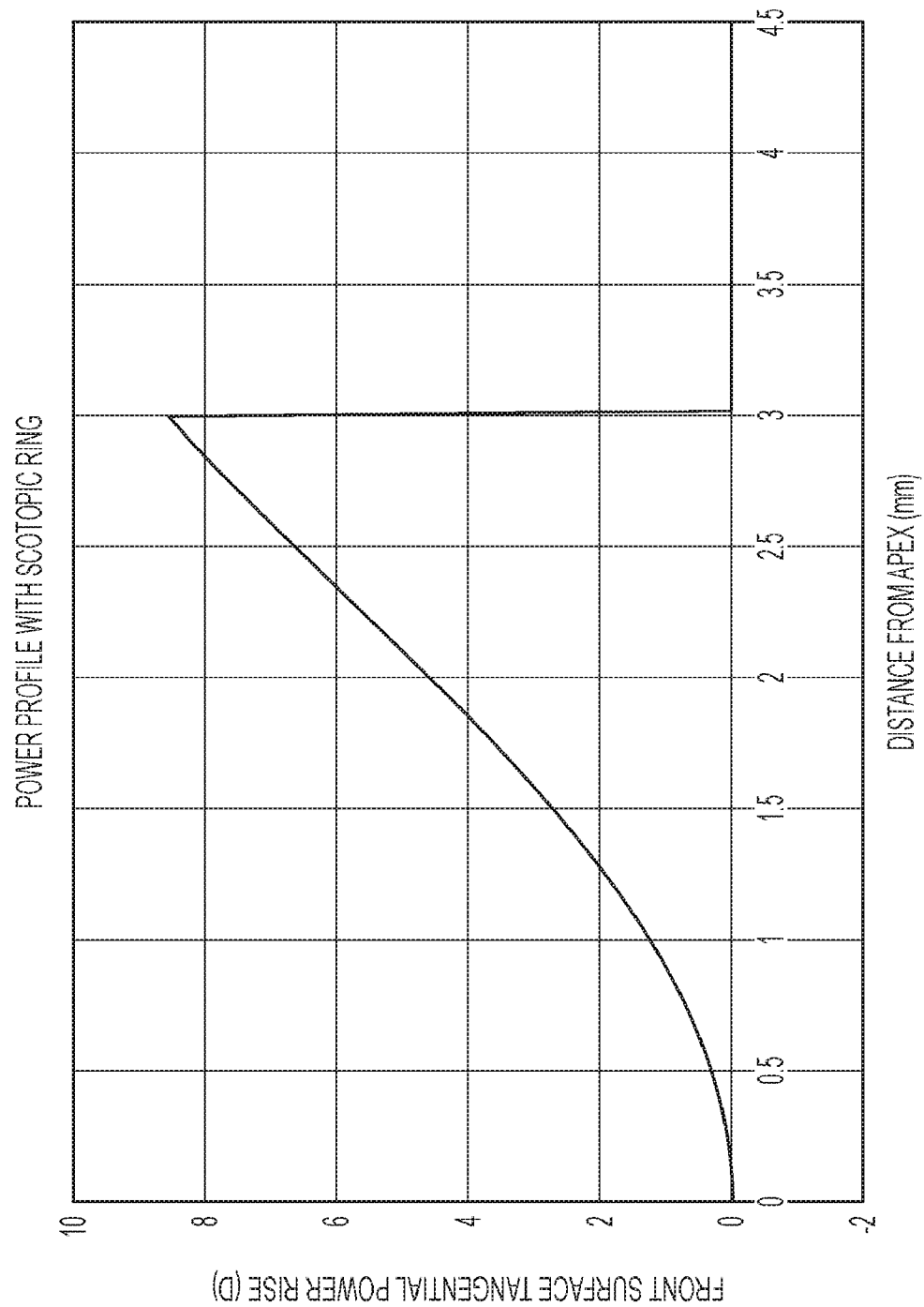
FIG. 10 is a plot of an exemplary power profile with a scotopic ring.

Table 11 illustrates various design numbers from Tables 1-A and 1-B with optical designs based on Table 10 and a "scotopic ring." A scotopic ring is an optical design where the power at, for example, a 3.0 mm radius reduces back to the power at the apex, and is described in more detail in U.S. Pat. No. 7,178,918, the contents of which are incorporated by reference herein in their entirety. An example of a power profile having a scotopic ring is shown in FIG. 10. An unanticipated finding during the testing of A1 and A2 was a rapid power and thickness increase that would excessively increase the thickness of the lenses. This was increased for the high water content etafilcon 58% material due to its lower refractive index. The scotopic ring design reduced this problem.

TABLE 12

Molded Etafilcon Designs With Scotopic Rings

| Design # | Aperture inducing power increase | General Summary |
|---|---|---|
| 11 | +2.375 | Reduced vision VA and subjective vision ratings |
| 12 | +2.75 | Preferable vision VA and subjective vision ratings |
| 13 | +3.125 | Reduced vision VA and subjective vision ratings |

As discussed above, experimental clinical testing was required to discover the best range of acceptable and unacceptable power profiles. These ranges are simply not capable of being determined by a mere optimization of known parameters to achieve the end results. Indeed, the end results are not predictable based on the parameters being measured.

As shown in Table 12, Design 12 with an aperture inducing power increase of +2.75D performed best on the objective tests and ratings of distance, intermediate, and near vision. One unexpected finding was that the lower power profile Design 11 at +2.375 was not the best design as with the previous lathe-cut polymacon 38% material contact lenses, but it still provided good near vision. The next unexpected finding was that the higher power profile Design 13 at +3.125 was now the new upper acceptable limit as it reduced distance vision.

The end result that was concluded by the above tests was that the best aperture inducing power increase for etafilcon lenses was +2.75, the range of acceptable aperture inducing power increases was limited to +2.375 to +3.125 and the unacceptable increases were ≤+2.375D and ≥+3.125D.

TABLE 13

Subjective Testing of Lenses

| Subjective at Dispensing | Average ± SD (min-max), n | | |
|---|---|---|---|
| | VTI It11 | VTI It12 | VTI It13 |
| Distance Vision | 85.7 ± 17.3 (30-100), 21 | 89.6 ± 10.7 (60-100), 21 | 80.4 ± 22.1 (20-100), 21 |
| Distance Ghosting | 90.8 ± 11.2 (50-100), 21 | 89.0 ± 12.2 (50-100), 21 | 83.5 ± 15.2 (50-100), 21 |
| Distance Haloes | 90.1 ± 12.4 (50-100), 21 | 87.7 ± 23.3 (0-100), 21 | 86.3 ± 20.3 (20-100), 21 |
| Distance Fluctuation | 84.2 ± 18.0 (50-100), 20 | 90.1 ± 12.6 (50-100), 21 | 83.0 ± 18.8 (20-100), 21 |
| Near Vision Good Lighting | 90.2 ± 10.3 (70-100), 21 | 92.0 ± 9.3 (70-100), 21 | 88.0 ± 15.3 (30-100), 21 |
| Near Vision Low Lighting | 76.6 ± 20.4 (20-100), 21 | 83.1 ± 14.3 (50-100), 21 | 75.0 ± 22.2 (20-100), 21 |
| Near Ghosting | 84.3 ± 13.5 (50-100), 21 | 83.3 ± 20.4 (25-100), 21 | 81.7 ± 17.8 (40-100), 21 |
| Near Haloes/Glare | 88.4 ± 13.0 (50-100), 21 | 86.2 ± 20.6 (30-100), 21 | 87.9 ± 14.2 (50-100), 21 |
| Near Fluctuation | 86.0 ± 14.4 (50-100), 21 | 87.9 ± 14.5 (50-100), 21 | 84.6 ± 13.1 (50-100), 21 |
| Intermediate Vision | 89.6 ± 11.0 (60-100), 21 | 88.1 ± 18.4 (20-100), 21 | 86.4 ± 12.1 (50-100), 21 |
| Using/Viewing Call Phone/PDA | 89.4 ± 10.8 (60-100), 20 | 92.0 ± 8.4 (70-100), 21 | 86.9 ± 12.3 (50-100), 21 |
| Overall Lens Visual Performance | 83.0 ± 17.7 (25-100), 21 | 85.7 ± 14.5 (50-100), 21 | 81.5 ± 16.7 (40-100), 21 |
| Overall Comfort | 89.7 ± 20.2 (25-100), 21 | 91.8 ± 9.2 (70-100), 21 | 91.1 ± 13.8 (40-100), 21 |

Table 13 shows that Design 12 had better overall lens visual performance and other key components of good vision for presbyopic wearers, such as distance vision, distance fluctuation, near vision good lighting, near vision low lighting and using/viewing cell phone/PDA.

Combining Design 12 (+2.75D aperture inducing power increase with the scotopic ring) with lens geometry discussed above with respect to Tables 1A and 1B, the present inventors found further improvement in vision and lens performance as shown in Design 24. Overall success rate for Design 24 was 93-95% with 91% intent to continue wearing the lens. As used herein, "success rate" means the percentage of wearers in which the lens treated presbyopia and where the users could perform their daily tasks while wearing the lens.

In clinical studies, sixty-one subjects were tested and fifty-nine subjects completed the trial, with their data being reported herein. The subjects were each provided with the Design 24 lens despite having different levels of presbyopia. Only the Design 24 lens was used because it included an 8.3 mm base curve, a midpoint of the critical 7.9 mm-8.5 mm base curve range. However, it was expected that all such lenses falling within the 7.9 mm-8.5 mm base curve range would exhibit similar subjective results based on the data above.

For high contrast high illumination visual acuities, no statistically significant differences were detected between best-corrected spectacle vision (BCSV) and the Design 24 lens. Also, for low contrast low illumination visual acuities, no statistically significant differences were detected between BCSV and Design 24 lens.

At one week of wear, both the high contrast high illumination and low contrast low illumination visual acuities for the Design 24 lens were within two letters of the BCSV. This was particularly impressive because of the difficulty for soft contact lenses, with their high water content, to achieve visual acuities similar to spectacles.

For stereoacuity, no statistically significant difference was detected between BCSV and the Design 24 lens. Stereoacuity is considered the leading indicator of how well the two eyes are working together, and is a critical attribute for eye-hand coordination tasks, such as the use of a cell phone. Published information on competitive multifocals demonstrates that other multifocals are not able to achieve this level of stereoacuity.

All twenty subjective visual attributes tested in the trial were rated as higher after one week of wear with the Design 24 lens than the habitual correction. Nineteen of the twenty visual attributes (95%) were determined to be statistically significantly better with the Design 24 lens than the habitual correction, with "Driving During the Day" being the only attribute that was not determined to be significantly statistically different in favor of the Design 24 lens, even though it was rated higher than the habitual correction.

The areas of the greatest difference in favor of the Design 24 lens were seen for near and intermediate tasks such as the need to not use supplemental reading glasses, reading very small print, using a cell phone, working on a computer, writing, personal grooming, and reading books or newspaper. These attributes were found to be 20-40 points greater with the Design 24 lens than they were for the habitual correction in subjective testing.

92.4% of subjects reported that they could meet all of their daily needs with just the Design 24 lens as compared 76.3% with their habitual corrections. This was determined to be a statistically significant difference in favor of the Design 24 lens.

Subjects were asked the question "Was your vision acceptable with the lenses available and could you complete all or most of your needed visual tasks with few issues that interfered with your vision," and 95% responded "yes" for the Design 24 lens versus only 53% for the habitual correction, a difference that was statistically significant in favor of the Design 24 lens.

Overall, among those 52 subjects who expressed a preference at the conclusion of the trial, the preference was 77% for the Design 24 lens versus 23% for all habitual corrections. This was determined to be a statistically significant difference in favor of the Design 24 lens.

Among those 8 subjects who wore Monovision as their habitual correction and expressed a preference at the conclusion of the trial, the preference was 88% for the Design 24 lens versus 12% for the Habitual Monovision. This was determined to be a statistically significant difference in favor of the Design 24 lens.

Among those twenty-four subjects who wore a competitive multifocal brand as their habitual correction and expressed a preference at the conclusion of the trial, the preference was 79% for the Design 24 lens versus 21% for the Habitual Multifocal brands combined as a group. This was determined to be a statistically significant difference in favor of the Design 24 lens.

The only brand of competitive multifocal that had a large enough sample to be statistically tested was AirOptix Multifocal (Alcon, Ft Worth, TX), which is currently the leading brand of multifocal. Among those eleven subjects who wore AirOptix Multifocal as their habitual correction and expressed a preference at the conclusion of the trial, the preference was 82% for the Design 24 lens versus 18% for the AirOptix Multifocal. This was determined to be a statistically significant difference in favor of the Design 24 lens.

Subjects were asked on a 5-point scale to rate how likely they were to continue wearing the lenses, with an average score of 4.11, where 4 represented likely and 5 represented very likely. Of the forty-four subjects who expressed intent to either continue wearing or not to continue wearing the lenses, 91% stated that were likely or very likely to continue wearing the Design 24 lens.

The comfort of the lenses was also rated very high at 92.5 out of 100, where 100 is considered extremely comfortable. This is notable given that almost 70% of the wearers typically wore a habitual silicone hydrogel lens material.

The Design 24 lens performed very well in terms of both objective and subjective visual results. The performance of the Design 24 lens for near and intermediate tasks was especially notable as these are the areas in which many competitive multifocals struggle. The high preference rates and the high likelihood to continue wearing the lens are both excellent indicators that the lens demonstrated successful performance with its unique single physical and optical aperture inducing power profile lens design.

The conclusion is that the single lens optimized lens geometry can meet all the physical design criteria of a comfortable and well fitted soft contact lens on a wide range of eye shapes and meet the optical design objective of keeping the center of the lens as close as practical to the pupil center or line of sight of the eye. When fitted this way the single power profile creates an induced optical aperture and increased depth of focus that can provide good distance, intermediate, and near vision to a wide age range of presbyopes that need a low spectacle near addition powers when they are younger and high spectacle near addition powers when they are older. The optimized one design per distance correcting sphere power had a 93 to 95% success rate.

While the above data relates to the optimum physical lens parameters for lathe cut 38% polymacon and cast molded etafilcon 58% lenses, other hydrogel, or more rigid or less rigid soft contact lens materials, could also be designed to optimize vision of lenses having an induced aperture. For example, the methodology discussed herein, and more explicitly set forth below, is applicable to other hydrogel materials and silicon hydrogel lenses to determine the appropriate parameters for comfort and fit, and the appropriate power profile for optical function.

Establishing the range of acceptable profiles conducted using lathe-cut polymacon 38% material contact lenses with different fitting characteristics to the later molded etafilcon 58% material contact lenses worked better with lower aperture inducing power profile increases like +2.375D. The fitting characteristics were less optimal with respect to a design objective of the physical lens parameter optimization to keep the center of the lens, where the center of the induced aperture is, as close as practical to the pupil center or line of sight of the eye. Specifically the fitting characteristics were:
 1. increased primary gaze decentration,
 2. increased lens lag and
 3. increased primary gaze lens movement with a blink.

This reduced overall vision and comfort with the lenses and the final success rate. It also meant testing different power profiles where the center of the induced aperture is now further from the pupil center or line of sight of the eye. Lower power profiles that induce larger apertures helped to cover the pupil and reduce optical distortions in these more misaligned lens fittings.

For the molded etafilcon 58% material contact lenses, the fitting characteristics were improved with respect to a design objective to keep the center of the lens, where the center of the induced aperture is, as close as practical to the pupil center or line of sight of the eye. For example, some of the fitting characteristics were:
 1. decreased primary gaze decentration,
 2. decreased lens lag and
 3. decreased primary gaze lens movement with a blink.

This meant testing different power profiles where the center of the induced aperture is closer to the pupil center or line of sight of the eye. Power profiles that induced smaller apertures could cover the pupil with reduced optical distortions in these less misaligned lens fittings. These smaller apertures produce more depth of focus and provide better near vision with older presbyopes which need higher reading addition powers in spectacles. These smaller apertures also have less optical effect on distance vision when close as practical to the pupil center or line of sight of the eye.

A methodology can be used to determine the acceptable parameters of a lens regardless of material. Starting with a steep and large diameter lens of 8.1 mm to 8.5 mm base curve, and 14.0 mm to 15.0 diameter, the peripheral thickness of the lens can be increased until the lens decentration is minimized. Similarly, the edge thickness can be reduced until the lens edge sensation is removed. The base curve can be reduced until movement is minimized or the lens stops moving or optically distorts on the eye. If the lens optically distorts on the eye and is still moving with a blink, the center thickness of the lens should be increased first. Generally the more flexible the soft contact lens material, the optimum physical lens parameters will include a steeper base curve, a larger diameter, and a thicker thickness profile. For example, using the above methodology and the data from the etafilcon and polymacon lenses, the inventors of the present invention determined that a lens with an induced aperture would function with an aperture inducing power rise of +2.00 to +3.25 D, preferably +2.75 D. For example, based on the above methodology and data, the present inventors determined that silicon hydrogel lenses would function within this range. Insubstantial differences from the above range would be based on scientifically and ANSI-accepted tolerances. As discussed above, the present invention can be directed to methods and devices including lenses. However, the invention is not so limited, and can include contact lenses, intraocular lenses, eyeglasses, other types of lenses, or any other optical device.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An ophthalmic lens comprising:
an apex area having distance vision correcting power and a power distribution creating a blurred region outside of the apex area so as to cause an induced aperture;
wherein the lens is made of polymacon;
wherein the power distribution includes a power profile having an aperture inducing power rise between +2.00 to +2.75 diopters; and
wherein the aperture inducing power rise is a front surface tangential power rise as determined at the 1.5 mm radius away from a center of the apex area.

2. The ophthalmic lens of claim 1, further comprising
a base curve between 7.9 mm and 8.5 mm; and
a lens diameter between 14.0 and 14.5 mm.

3. The ophthalmic lens of claim 2, wherein the base curve is between 8.1 mm and 8.3 mm.

4. The ophthalmic lens of claim 1, further comprising a thickness profile having a center thickness of 100-120 microns, and a peripheral thickness of 220-310 microns.

5. The ophthalmic lens of claim 2, wherein the lens diameter is between 14.3 mm to 14.5 mm.

6. The ophthalmic lens of claim 1, wherein a sag of the lens is between about 3.7 mm to 4.75 mm.

7. The ophthalmic lens of claim 1, further comprising a scotopic ring outside of the apex area and blurred region.

8. An ophthalmic lens comprising:
an apex area having distance vision correcting power and a power distribution creating a blurred region outside of the apex area so as to cause an induced aperture;
wherein the lens is made of etafilcon;
wherein the power distribution includes a power profile having an aperture inducing power rise between +2.375 to +3.125 diopters; and
wherein the aperture inducing power rise is a front surface tangential power rise as determined at the 1.5 mm radius away from a center of the apex area.

9. The ophthalmic lens of claim 8, further comprising
a base curve between 7.9 mm and 8.5 mm; and
a lens diameter between 14.0 and 14.5 mm.

10. The ophthalmic lens of claim 9, wherein the base curve is between 8.1 mm and 8.3 mm.

11. The ophthalmic lens of claim 8, further comprising a thickness profile having a center thickness of 100-120 microns, and a peripheral thickness of 220-310 microns.

12. The ophthalmic lens of claim 9, wherein the lens diameter is between 14.3 mm to 14.5 mm.

13. The ophthalmic lens of claim 8, wherein a sag of the lens is between about 3.7 mm to 4.75 mm.

14. The ophthalmic lens of claim 8, further comprising a scotopic ring outside of the apex area and blurred region.

15. An ophthalmic lens comprising:
an apex area having distance vision correcting power and a power distribution creating a blurred region outside of the apex area so as to cause an induced aperture;
wherein the lens is made of silicon hydrogel;
wherein the power distribution includes a power profile having an aperture inducing power rise between +2.00 to +3.25 diopters; and
wherein the aperture inducing power rise is a front surface tangential power rise as determined at the 1.5 mm radius away from a center of the apex area.

16. The ophthalmic lens of claim 15, further comprising
a base curve between 7.9 mm and 8.5 mm; and
a lens diameter between 14.0 and 14.5 mm.

17. The ophthalmic lens of claim 16, wherein the base curve is between 8.1 mm and 8.3 mm.

18. The ophthalmic lens of claim 15, further comprising a thickness profile having a center thickness of 100-120 microns, and a peripheral thickness of 220-310 microns.

19. The ophthalmic lens of claim 16, wherein the lens diameter is between 14.3 mm to 14.5 mm.

20. The ophthalmic lens of claim 15, wherein a sag of the lens is between about 3.7 mm to 4.75 mm.

21. The ophthalmic lens of claim 15, further comprising a scotopic ring outside of the apex area and blurred region.

* * * * *